United States Patent [19]

Tanaka et al.

[11] Patent Number: 5,411,325
[45] Date of Patent: May 2, 1995

[54] TWO WHEELED VEHICLE BRAKING SYSTEM USING A TARGET SLIPPAGE RATIO FOR CONTROL

[75] Inventors: Keishin Tanaka; Toichiro Hikichi; Chiaki Kumagai, all of Wako, Japan

[73] Assignee: Honda Giken Kogyo Kabushiki Kaisha, Tokyo, Japan

[21] Appl. No.: 80,786

[22] Filed: Jun. 24, 1993

[30] Foreign Application Priority Data

| Jun. 24, 1992 | [JP] | Japan | 4-166369 |
| Jun. 26, 1992 | [JP] | Japan | 4-169270 |
| Jun. 29, 1992 | [JP] | Japan | 4-171114 |
| Jun. 30, 1992 | [JP] | Japan | 4-173405 |

[51] Int. Cl.$^6$ ............................................. B60T 8/32
[52] U.S. Cl. ..................................... 303/100; 303/110; 364/426.03
[58] Field of Search ............... 303/9.64, 100, 103, 303/105, 110, 113.2, 116.2, 20; 364/426.03; 180/197, 219

[56] References Cited

U.S. PATENT DOCUMENTS

| 4,745,552 | 5/1988 | Phelps et al. | 180/197 X |
| 4,989,922 | 2/1991 | Pickenhahn et al. | 303/100 |
| 5,217,087 | 6/1993 | Ikegami et al. | 180/219 |
| 5,244,259 | 9/1993 | Pickenhahn et al. | 303/111 |
| 5,246,278 | 9/1993 | Yoshino et al. | 303/111 X |

FOREIGN PATENT DOCUMENTS

| 62-194963 | 8/1987 | Japan |
| 63-24166 | 2/1988 | Japan |
| 63-78867 | 4/1988 | Japan |
| 2-216355 | 8/1990 | Japan |

*Primary Examiner*—Josie A. Ballato

[57] ABSTRACT

A brake control system for obtaining the optimal slippage ratio for stable braking of a vehicle, has a friction coefficient detecting device, a target slippage ratio setting device, a correction coefficient setting device and a target slippage ratio correcting device. The friction coefficient detecting device detects the coefficient of friction between each of wheels and a road surface. The target slippage ratio setting device sets up a target slippage ratio based on the coefficient of friction. The correction coefficient setting device detects the rate of change in the coefficient of friction and sets a first correction coefficient for calculating the target slippage ratio based on the rate of change in the coefficient of friction. The target slippage ratio correcting device multiplies the target slippage ratio by the first correction coefficient thereby to correct the target slippage ratio. Thus, the vehicle can be smoothly driven.

11 Claims, 17 Drawing Sheets

| Vref | 0~60 km/h | 60~70 km/h | 70~ km/h |
|---|---|---|---|
| NO-brake | (III) | (IV) / (V) | (VI) |
| braking | (I) | (II) | |

FIG.16

| | $\mu(n)/\mu(n-1)$ | 0 | 0.5 | 1.25 | 1.5 | 2.0 |
|---|---|---|---|---|---|---|
| $\theta_{B(n)} \geqq \theta_0$ | $\mu(n-1) \geqq 0.55$ | 0.5 | 1.0 | 0.5 | 0.5 | 0.5 |
| | $\mu(n-1) \leqq 0.55$ | 0.5 | 1.0 | 1.0 | 0.5 | 0.2 |
| $\theta_{B(n)} < \theta_0$ | $\mu(n-1) \geqq 0.55$ | 0.7 | 1.0 | 0.3 | 0.3 | 0.3 |
| | $\mu(n-1) \leqq 0.55$ | 0.7 | 1.0 | 1.0 | 0.5 | 0.2 |

TWO WHEELED VEHICLE BRAKING SYSTEM USING A TARGET SLIPPAGE RATIO FOR CONTROL

BACKGROUND OF THE INVENTION

1. Field of the Invention

This invention relates to a brake control system capable of changing a target slippage ratio to another so that the optimum braking force can be obtained upon braking of a vehicle.

2. Description of the Related Art

There is known a brake control system for motor vehicles, such as motorcars and motorcycles, which calculates slippage ratios for wheels with respect to a road surface based on the running speed of the vehicle and the peripheral speed of each wheel, and applies the optimum braking force to the vehicle based on the calculated slippage ratios.

In the brake control system, the hydraulic pressure of a brake is varied proportionally to the amount of depression of a brake pedal, thereby to increase a braking force until a predetermined slippage ratio (hereinafter called a "target slippage ratio"), at which the braking force becomes the maximum, is reached (hereinafter called "normal control mode"). Upon attainment of the target slippage ratio, the control mode is shifted to limit an increase in the hydraulic pressure of the brake so as to avoid a further increase in the slippage ratio (hereinafter called a "limiting control mode").

There is a relationship between the slippage ratio of each wheel with respect to the road surface and the coefficient of friction of the wheel and the road surface. Namely, the slippage ratio, at which a vehicle can stably be controlled, differs between road surfaces having a high coefficient of friction (hereinafter called a "high $\mu$ road") and others having a low coefficient of friction (hereinafter called a "low $\mu$ road").

A high $\mu$ road is usually assumed, in the conventional brake control system, in setting a target slippage ratio. Upon entering the limiting control mode, the coefficient of friction $\mu$ between the wheel and an actual road surface is then calculated to change the target slippage ratio to another, thereby to enlarge the range in which the normal control mode is applicable. There has been disclosed in Japanese Patent Application Laid-Open Publication No. 62-194963 such a technical idea of detecting the coefficient of friction $\mu$ between the wheel and the actual road surface at the time of shifting the control modes from normal to limiting.

However, in the conventional brake control system referred to above, the detection of the coefficient of friction $\mu$ is initiated after the normal control mode has been shifted to the limiting control mode. Thus, there was a danger of setting a suitable target slippage ratio too late, i.e., after the control mode shift.

There is the situation in which the coefficient of friction $\mu$ between the surface of an actual running road and each wheel changes with a variation in the condition of the road surface. For example, slippage ratios vary between a low $\mu$ road whose surface is Eisbahn, i.e., a frozen snow surface or the like, and a high $\mu$ road which has an asphalt surface or the like. Thus, when a target slippage ratio with respect to a so-called $\mu$ jump road surface (where the surface of a road changes from the low $\mu$ road to the high $\mu$ road, for example), is changed to another, and a normal increase in the hydraulic pressure of the brake is made under a conventional brake control mode, the braking force greatly varies due to time delays or the like, so that the feeling of braking of the vehicle deteriorates due to the resulting vibrations.

Further, when an unevenness or irregularity appears on the road surface while the motorcar or motorcycle is running, the vehicle greatly vibrates. Thus, when the velocity of the vehicle and the coefficient of friction of the road surface are determined based on the output of a sensor or the like, noise is excessively included therein. As a result, there is the possibility that a target slippage ratio cannot be obtained with predetermined accuracy.

If the target slippage ratio is set up in a state in which information other than the coefficient of friction of the road surface (such as the behavior of the vehicle, the condition of the road surface, etc.) has also been taken into consideration, then a further accurate control of braking of the vehicle can be carried out. Thus, there is a demand for a brake control system for setting a target slippage ratio based on information such as the behavior of the vehicle, the condition of the road surface, etc.

In this type of brake control system, a slippage ratio used for the control of braking of the vehicle is calculated from the peripheral velocity of each wheel and the velocity of the vehicle. Alternatively, even in the case of a drive power control apparatus for adjusting the ignition timing of an engine according to a rapid start and a variation in the coefficient of friction of the road surface thereby to control a driving force, the peripheral velocity of each wheel and the velocity of the vehicle are used to control the braking of the vehicle in the same manner.

The peripheral velocity of the wheel can be obtained by directly detecting the rotational speed of each wheel with the sensor. It is however difficult to directly detect the velocity of the vehicle with a sensor. In a vehicle such as a motorcycle in particular, whose weight and size are greatly restricted, the direct detection of the vehicle velocity is actually impossible. Thus, a method of estimating the velocity of the vehicle based on the peripheral velocity of each wheel or the acceleration of the vehicle is normally used.

Described specifically, for example, there are known methods: one for selecting a peripheral velocity of one of a plurality of wheels, which is rotated at the fastest speed, thereby to calculate an estimated velocity of a vehicle (see Japanese Patent Application Laid-Open Publication No. 63-78867) (hereinafter called a "Hi-select system); another one for integrating an acceleration or deceleration of a vehicle detected by a vehicle acceleration detector thereby to obtain an estimated velocity of the vehicle (see Japanese Patent Application Laid-Open Publication No. 63-24166); and a further one for comparing a peripheral velocity of each wheel and the present estimated velocity of a vehicle and updating the estimated velocity of the vehicle at a given acceleration or deceleration based on the result of comparison.

However, when each wheel slips on the road surface, there is often a situation in which the estimated velocity of the vehicle based on the peripheral velocity of the wheel is set to a larger value as compared with an actual velocity of the vehicle. Thus, when each wheel slips on the road surface upon starting the vehicle, for example, the first method, i.e., the Hi-select system, tends to cause improper control in the brake control system or the drive power control apparatus. In the second method referred to above, there is the possibility that noise is included in the acceleration or deceleration of the vehicle due to the vibrations of the vehicle, which occur according to the state of the road surface. Thus, when the acceleration or deceleration of the vehicle is integrated and updated, the noise is also integrated. Consequently, there is the possibility that the estimated velocity of the vehicle does not come close to the actual velocity of the vehicle. Further, the third method causes inconvenience in that the set predetermined acceleration or deceleration should be changed over to another in the case of travelling over two road surfaces, one having a low coefficient of friction (low $\mu$ road) and the other having a high coefficient of friction (high $\mu$ road).

Further, when such a braking control is effected on the motorcycle, the control of braking can be better carried out by inclining the vehicle from the vertical in a direction perpendicular to the running direction of the vehicle (hereinafter called a "banking angle"). As methods of detecting the banking angle, there have been proposed a method of detecting the distance between a predetermined portion of a vehicle and the road surface with a sensor (see Japanese Patent Publication Laid-Open No. 2-216355), a method of detecting a banking angle with an inclinometer, a method of determining a banking angle by computation based on a steering angle and an estimated velocity of a vehicle.

However, the inclinometer is very expensive. And in the method of measuring the distance between the road surface and the predetermined portion of the vehicle with the sensor and determining the banking angle based on the result of measurement, much noise is produced due to the reflection of light onto the road surface or an irregularity of the road surface, for example. It is thus difficult to determine the banking angle with high accuracy.

Further, the method of determining the banking angle by computation based on the steering angle and the estimated velocity of the vehicle tends to cause a poor or rough correlation between the steering angle and the banking angle while the vehicle is running at a high speed, resulting in reduced reliability.

SUMMARY OF THE INVENTION

A principal object of the present invention is to provide a brake control system capable of properly effecting the control of braking of a vehicle based on a variation in the condition of a road surface or the behavior of the vehicle, for example.

Another object of the present invention is to provide an estimated vehicle velocity calculating device capable of estimating an estimated velocity of a vehicle required for the control of braking of the vehicle, the control of a driving force or the like easily and very accurately.

A further object of the present invention is to provide a banking angle calculating device which is inexpensive and capable of calculating a banking angle of a vehicle with sufficient accuracy.

According to a first aspect of the present invention, for achieving the above objects, there is provided a brake control system for controlling a slippage ratio to a target slippage ratio thereby to provide a stable control of braking of a vehicle, comprising:

friction coefficient detecting means for detecting the coefficient of friction between each of wheels and a road surface;

target slippage ratio setting means for setting a target slippage ratio based on the coefficient of friction;

first correction coefficient setting means for detecting the rate of change in the coefficient of friction and setting a first correction coefficient for controlling the target slippage ratio according to the rate of change in the coefficient of friction; and target slippage ratio correcting means for multiplying the target slippage ratio by the first correction coefficient thereby to correct the target slippage ratio.

In the brake control system according to the present invention, the target slippage ratio is set up based on the coefficient of friction of the road surface. At this time, the first correction coefficient is determined based on the degree of change in the friction coefficient. The target slippage ratio is multiplied by the first correction coefficient thereby to correct the target slippage ratio. Thus, the target slippage ratio in which the condition of the road surface or the behavior of the vehicle has been taken into consideration, can be obtained.

In the above brake control system, the first correction coefficient setting means preferably includes correction coefficient storing means for storing therein as data, a relationship between the rate of change in a coefficient of friction detected this time with respect to a coefficient of friction detected in a previous time and the first correction coefficient of the target slippage ratio, and sets the first correction coefficient based on the rate of change using the correction coefficient storing means.

The brake control system further includes banking angle detecting means for detecting the banking angle. Further, the correction coefficient storing means stores therein as data, a relationship between the banking angle and the first correction coefficient of the target slippage ratio. The first correction coefficient may be set up based on the banking angle by making use of the correction coefficient storing means.

In the brake control system, the friction coefficient detecting means preferably comprises:

first slippage ratio calculating means for calculating a slippage ratio of one of wheels based on a peripheral velocity of the one wheel and an estimated velocity of the vehicle;

vehicle acceleration detecting means for detecting an acceleration or deceleration of the vehicle;

wheel acceleration calculating means for calculating a peripheral acceleration or deceleration of the one wheel based on the peripheral velocity of the one wheel;

calculation instructing means for generating a calculation instructing signal when the slippage ratio of the one wheel and the peripheral acceleration or deceleration of the one wheel respectively satisfy predetermined conditions such as conditions under which the peripheral acceleration or deceleration of the one wheel reaches a predetermined value or larger and the slippage ratio of the one wheel becomes positive; and friction coefficient calculating means for calculating the coefficient of friction between the road surface and the one wheel based on the slippage ratio of the other wheel and the acceleration or deceleration of the vehicle detected in response to the calculation instructing signal.

Preferably, the brake control system further comprises second correction coefficient setting means for detecting the condition of irregularity of the road surface and setting a second correction coefficient for controlling a target slippage ratio according to the detected condition of irregularity. Further, the target slippage ratio correcting means preferably multiplies the target slippage ratio by the second correction coefficient thereby to correct the target slippage ratio.

Moreover, the brake control system comprises an estimated vehicle velocity detecting means for detecting an estimated velocity of the vehicle and steering angle detecting means for detecting a steering angle. The second correction coefficient setting means can also set a second correction coefficient for controlling a target slippage ratio based on the rate of change in the steering angle with respect to the estimated velocity of the vehicle.

According to a second aspect of the present invention, there is provided a device for calculating an estimated velocity of a vehicle based on a peripheral velocity of each wheel and an acceleration or deceleration of the vehicle, comprising:

- wheel velocity detecting means for detecting a peripheral velocity of each wheel;
- vehicle acceleration detecting means for detecting an acceleration or deceleration of the vehicle;
- acceleration deciding means for determining, based on the acceleration or deceleration of the vehicle or a predetermined control signal, whether the vehicle is in an acceleration or deceleration state; and
- estimated vehicle velocity calculating means for comparing the peripheral velocity of each wheel and the present estimated velocity of the vehicle when it is decided by the acceleration deciding means that the vehicle is not in the acceleration or deceleration state, successively updating the estimated velocity of the vehicle under a preset acceleration or deceleration, based on the result of comparison, and successively updating the present estimated velocity of the vehicle under the acceleration or deceleration of the vehicle when it is decided that the vehicle is in the acceleration or deceleration state, thereby calculating an estimated velocity of the vehicle.

In the device according to the present invention, the acceleration deciding means makes a decision as to whether the vehicle is in the acceleration or deceleration state, based on a signal indicative of the acceleration or deceleration of the vehicle or the predetermined control signal. If it is decided that the vehicle is not in the acceleration or deceleration state, then the estimated vehicle velocity calculating means compares the peripheral velocity of each wheel and the estimated velocity of the vehicle and successively updates the estimated velocity of the vehicle under the preset acceleration or deceleration based on the result of comparison. Thus, the influence of noise is reduced because the detected acceleration or deceleration of the vehicle is not used. If it is decided by the acceleration deciding means that the vehicle is in the acceleration or deceleration state, then the estimated vehicle velocity calculating means successively updates the present estimated velocity of the vehicle under the acceleration or deceleration of the vehicle, thereby obtaining the corresponding estimated velocity of the vehicle. Thus, the estimated velocity of the vehicle can be obtained with sufficient accuracy without being affected by the difference between the peripheral velocity of each wheel and the actual velocity of the vehicle, which is produced upon acceleration or deceleration.

According to a third aspect of the present invention, there is provided a device for calculating the vehicle banking angle, comprising:

- front wheel velocity detecting means for detecting a peripheral velocity of a front wheel;
- rear wheel velocity detecting means for detecting a peripheral velocity of a rear wheel;
- estimated vehicle velocity detecting means for detecting an estimated velocity of the vehicle based on the peripheral velocity of each wheel or an acceleration or deceleration of the vehicle; and
- first banking angle storing means for storing therein as data, a relationship between a difference in peripheral velocity between the front and rear wheels and a banking angle with respect to the peripheral velocity of the front wheel,
- whereby the banking angle is calculated from the detected peripheral velocity of the front wheel and the difference using the first banking angle storing means when the estimated velocity of the vehicle reaches or exceeds a predetermined value.

In the banking angle calculating device according to the present invention, the banking angle is calculated based on the peripheral velocities of the front and rear wheels and the difference in peripheral velocity between the front and rear wheels. In this case, the peripheral velocity of each wheel is calculated based on a turning radius (distance between the center of each rotating wheel and a wheel grounding point) extending in the vertical direction and the rotational speed (number of rotations) of each wheel. When the vehicle is inclined even if the velocity of the vehicle is constant, the actual turning radius is reduced, so that the rotational speed (number of revolutions) of each wheel is increased. Therefore, since points where the calculated peripheral velocities of wheels increase and the radii of the front and rear wheels respectively differ from one another, the banking angle was obtained in view of the fact that the difference in peripheral velocity between the wheels varies according to a change in the banking angle. Thus, the banking angle can be calculated with high accuracy.

Preferably, the bank angle calculating device also comprises:

- steering angle detecting means for detecting a steering angle of a handle; and
- second banking angle storing means for storing therein as data, a relationship between the steering angle and the peripheral velocity of the front wheel,
- whereby the banking angle is calculated from the detected peripheral velocity of front wheel and the steering angle using the second banking angle storing means when the estimated velocity of the vehicle is below a predetermined value.

More preferably, the banking angle calculating device further comprises:

- braking detecting means for detecting the braking of the vehicle; and
- third banking angle storing means for storing therein as data, a relationship between the estimated velocity of the vehicle in a braked state and the banking angle with respect to the steering angle,
- whereby the banking angle is determined from the estimated velocity of the vehicle and the steering angle using the third banking angle storing means when the braking of the vehicle has been detected by the braking detecting means.

In the banking angle calculating device, the braking detecting means includes slippage ratio calculating means for calculating slippage ratios of the front and rear wheels based on the peripheral velocities of the wheels and the estimated velocity of the vehicle, and can decide that the vehicle is in a braked state when each of the slippage ratios reaches a predetermined value or larger.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 16 is a table used for deciding a correction coefficient by the system shown in FIG. 1;

DETAILED DESCRIPTION OF THE PREFERRED EMBODIMENTS

A brake control system according to the present invention will be described in detail with reference to the accompanying drawings in which a preferred embodiment is shown by way of illustrative example.

Figure 1:
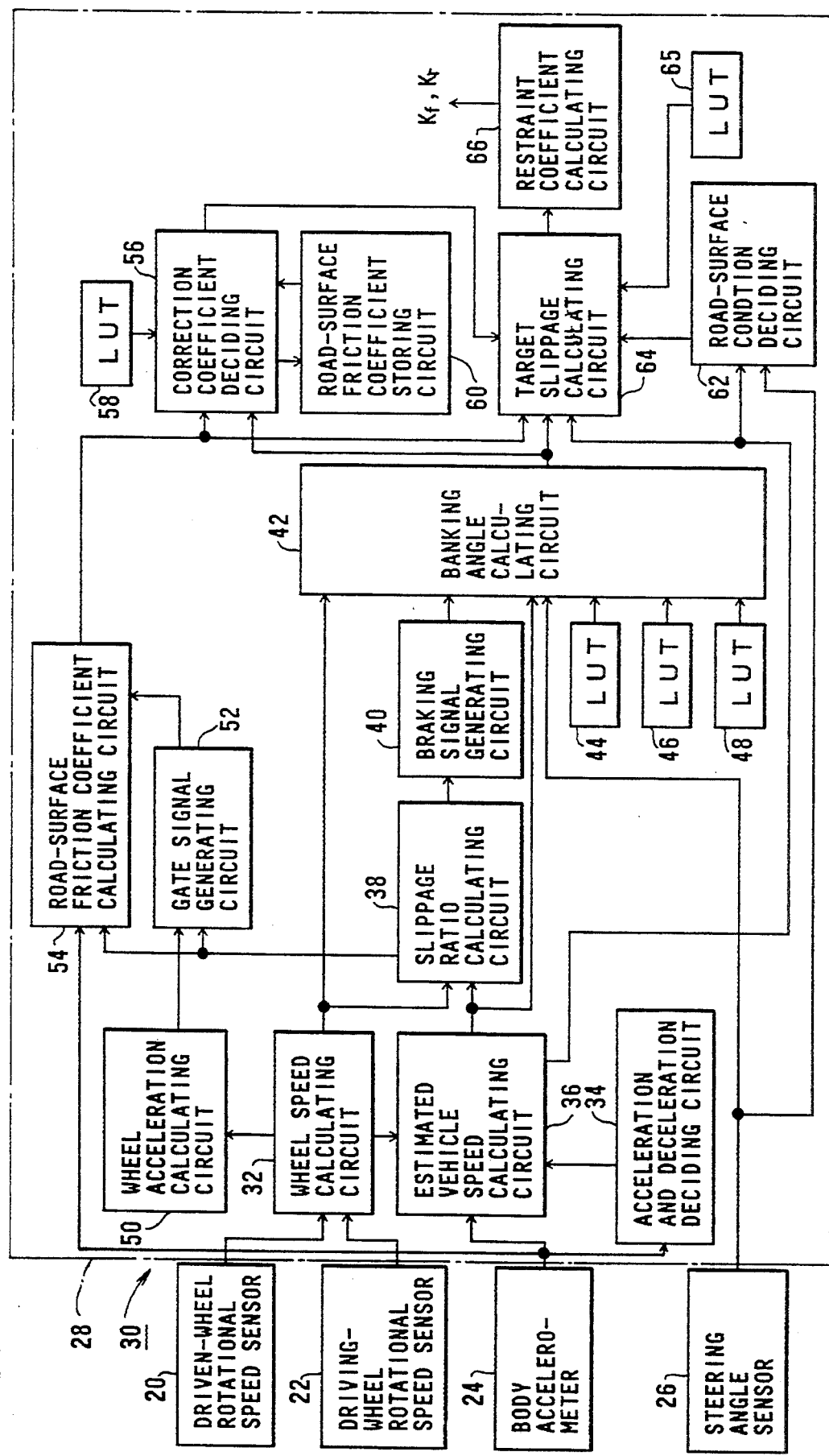
FIG. 1 is a block diagram showing the overall structure of a brake control system according to the present invention.
Figure 2:
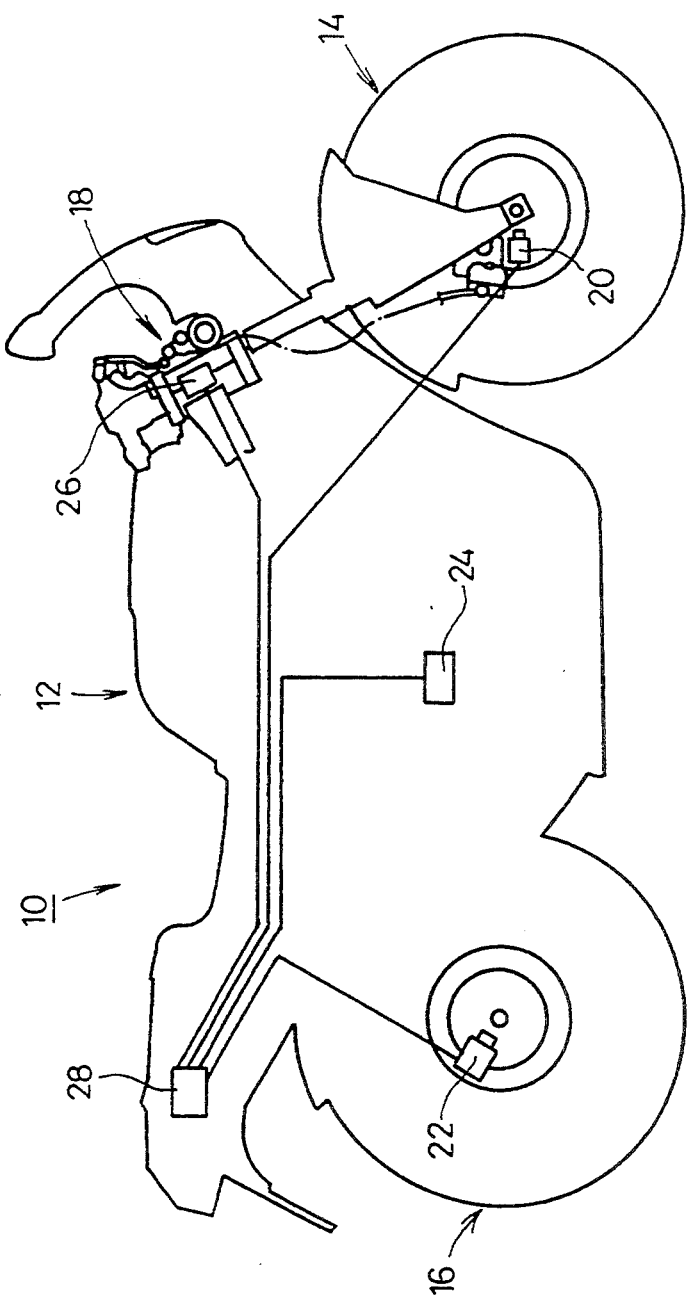
FIG. 2 is a view explaining a motorcycle equipped with the system shown in FIG. 1.

In FIG. 2, reference numeral 10 indicates a motorcycle, which comprises a main body 12, a front wheel (driven wheel) 14, a rear wheel (driving wheel) 16 and a handle 18. A sensor 20, for detecting a rotational velocity or speed of the driven wheel 14, and a sensor 22, for detecting the rotational velocity or speed of the driving wheel 16, each of which comprises a rotary encoder or the like, are respectively mounted on the front and rear wheels 14 and 16. Further, a body accelerometer 24 is attached to the main body 12 and a steering angle sensor 26 is mounted on the handle 18. The sensors 20, 22, 24 and 26 are electrically connected to a control unit 28. A system 30 for controlling brakes, which is shown in FIG. 1, is made up of these components.

The control unit 28 will now be more specifically described. There is a wheel speed calculating circuit 32 for calculating the peripheral speed $V_{wf}$ and $V_{wr}$ of the front and rear wheels 14 and 16 based on signals outputted from the sensors 20 and 22. There is an acceleration and deceleration deciding circuit 34 for determining whether the motorcycle 10 is in an acceleration or deceleration state, based on a signal outputted from the sensor 24. There is an estimated vehicle velocity calculating circuit 36 for calculating an estimated velocity of the vehicle $V_{ref}$ based on a wheel peripheral speed signal outputted from the wheel speed calculating circuit 32, a vehicle acceleration and deceleration signal outputted from the sensor 24 and an acceleration and deceleration deciding signal produced from the acceleration and deceleration deciding circuit 34. There is a slippage ratio calculating circuit 38 for calculating slippage ratios $S_f$ and $S_r$ of the front and rear wheels 14 and 16 based on the wheel peripheral speed $V_{wf}$ and $V_{wr}$ and the estimated velocity of the vehicle $V_{ref}$. There is a braking signal generating circuit 40 for deciding, based on the slippage ratios $S_f$ and $S_r$, whether the braking has been effected, and generating braking signals $\lambda_{B1}$ and $\lambda_{B2}$ of the front and rear wheels 16. There is a banking angle calculating circuit 42 for calculating a banking angle $\theta_B$ based on the estimated velocity of the vehicle $V_{ref}$, the peripheral speed of the wheels $V_{wf}$ and $V_{wr}$, the braking signals $\lambda_{B1}$ and $\lambda_{B2}$ and a steering angle signal detected by the steering angle sensor 26, look-up tables (hereinafter called "LUTs") 44, 46 and 48 to be described later, from which data are supplied to the banking angle calculating circuit 42. There is a wheel acceleration calculating circuit 50 for calculating peripheral accelerations $\alpha_{wf}$ and $\alpha_{wr}$ of the front and rear wheels 14 and 16, based on the peripheral speed $V_{wf}$ and $V_{wr}$ of the wheels. There is a gate signal generating circuit 52 for generating a gate signal based on the respective peripheral acceleration of the wheels $\alpha_{wf}$ and $\alpha_{wr}$ and the slippage ratios $S_f$ and $S_r$. There is a road-surface friction coefficient calculating circuit 54 for calculating coefficients of friction $\mu_f$ and $\mu_r$ between the road surface and the front and rear wheels 14 and 16 based on the acceleration of the vehicle $G_x$ and the slippage ratios $S_f$ and $S_r$ in response to the gate signal. There is a correction coefficient deciding circuit 56 for determining correction coefficients $\eta j_f$ and $\eta j_r$ with respect to the front and rear wheels 14 and 16 based on the coefficients of friction $\mu_f$ and $\mu_r$ and the banking angle $\theta_B$, an LUT 58 electrically connected to the correction coefficient deciding circuit 56. There is a road-surface friction coefficient storing circuit 60 and a road-surface condition deciding circuit 62 for determining the state of the road surface based on the steering angle signal and the estimated velocity of the vehicle $V_{ref}$ and outputting a correction coefficient $\eta 1$ based on the result of determination. There is a target slippage ratio calculating circuit 64 for calculating target slippage ratios $S1_f$ and $S1_r$ of the front and rear wheels 14 and 16, at which the optimum braking forces are obtained, based on the estimated velocity of the vehicle $V_{ref}$, the banking angle $\theta_B$, the coefficients of friction $\mu_f$ and $\mu_r$, the correction coefficients $\eta j_f$ and $\eta j_r$ and the correction coefficient $\eta 1$, an LUT 65 electrically connected to the target slippage ratio calculating circuit 64. There is a restraint coefficient calculating circuit 66 for calculating control or restraint coefficients $K_f$ and $K_r$ used for the braking control of the front and rear wheels 14 and 16, based on ratios between the target slippage ratios $S1_f$ and $S1_r$ and their corresponding target slippage ratios $S0_f$ and $S0_r$ preset to the front and rear wheels 14 and 16.

The brake control system 30 constructed as described above calculates the restraint coefficients $K_f$ and $K_r$ in the following manner. Since the restraint coefficient $K_f$ with respect to the front wheel 14 end the restraint coefficient $K_r$ with respect to the rear wheel 16 are calculated in a substantially identical way, only the way of calculating the restraint coefficient $K_f$ will be described in the present embodiment.

First, a target slippage ratio $Smax_f$ at which the optimum control force is obtained, is calculated from the estimated velocity of the vehicle $V_{ref}$, the banking angle $\theta_B$ and the coefficient of friction $\mu_f$. Next, the correction coefficients $\eta j_f$ and $\eta 1$ are calculated based on the state of the road surface and the behavior of the vehicle. Further, the target slippage ratio $Smax_f$ is multiplied by the calculated correction coefficients $\eta j_f$ and $\eta 1$ ($Smax_f \times \eta j_f \times \eta 1$). Thus, the target slippage ratio capable of properly controlling the braking can be obtained. Further, when the brake control system according to the present embodiment is added to the conventional brake control system, the ratio (restraint coefficient K) between the $Smax_f \times \eta j_f \times \eta 1$ and the target slippage ratio $S0_f$ employed in the conventional system is calculated from the following equation:

$$K_f = Smax_f / S0_f \times \eta j_f \times \eta 1$$

The actual control of braking of the vehicle is carried out by multiplying a signal produced from an output device, such as a valve signal used for controlling the hydraulic pressure of the brake, by the so-calculated restraint coefficient $K_f$.

First, a description regarding the determination of the estimated velocity of the vehicle $V_{ref}$, the banking angle $\theta_B$ and the coefficient of friction $\mu_f$ will be made, followed by a description of the determination of the target slippage ratio $Smax_f$ and the correction coefficients $\eta j_f$ and $\eta 1$.

Figure 3:
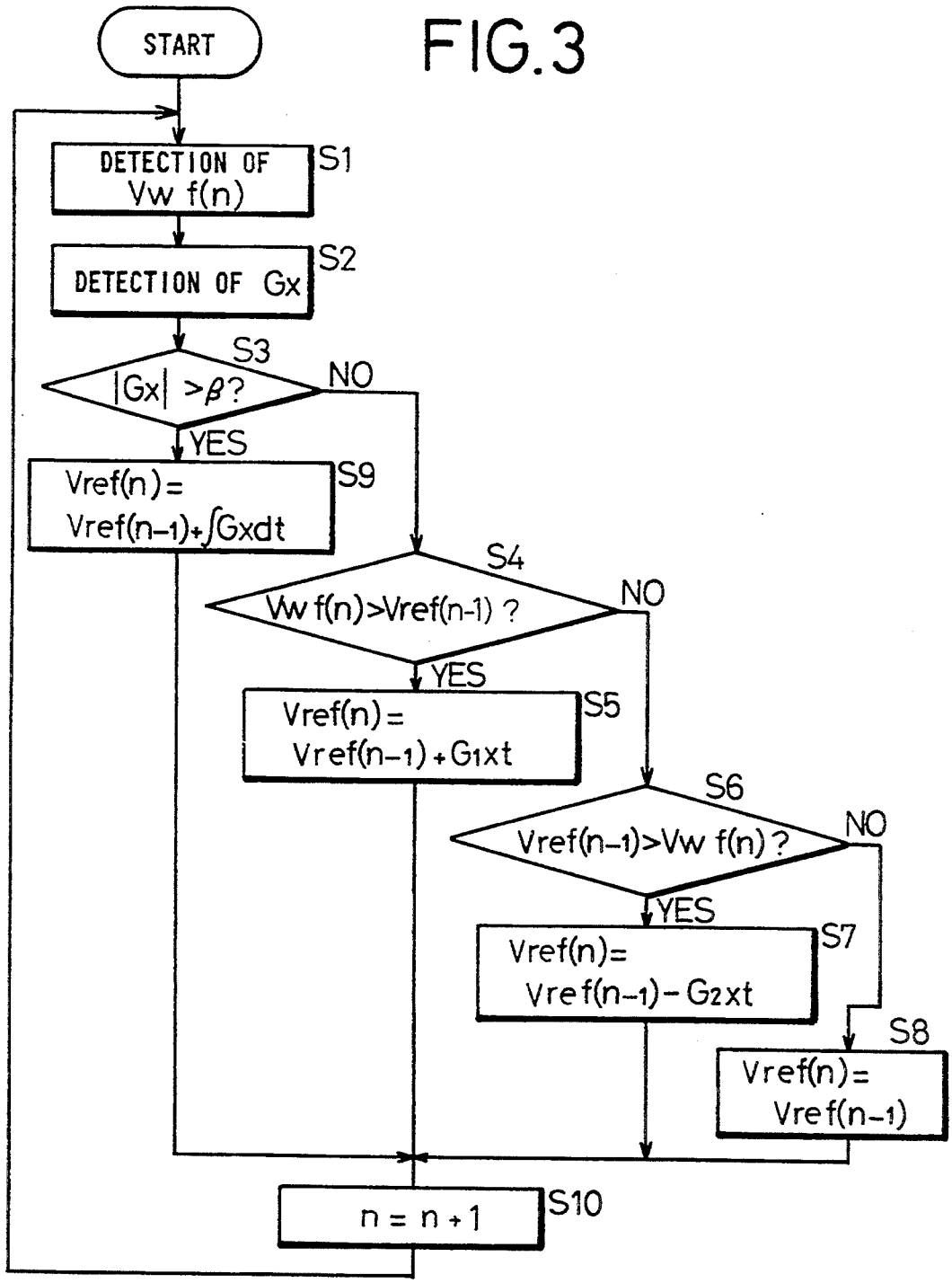
FIG. 3 is a flowchart describing the way of calculating an estimated velocity of the vehicle by the system shown in FIG. 1.

In the present embodiment, the peripheral speed of the driven and driving wheels $V_{wf}$ and $V_{wr}$ are calculated and the estimated velocity of the vehicle $V_{ref}$ are calculated based on the peripheral speed of the wheels $V_{wf}$ and $V_{wr}$. Now, a description regarding determination of the estimated velocity of the vehicle $V_{ref}$ based on the peripheral speed of the driven wheel (front wheel 14) $V_{wf}$ will be made with reference to FIGS. 3, 4 and 5.

Figure 4:
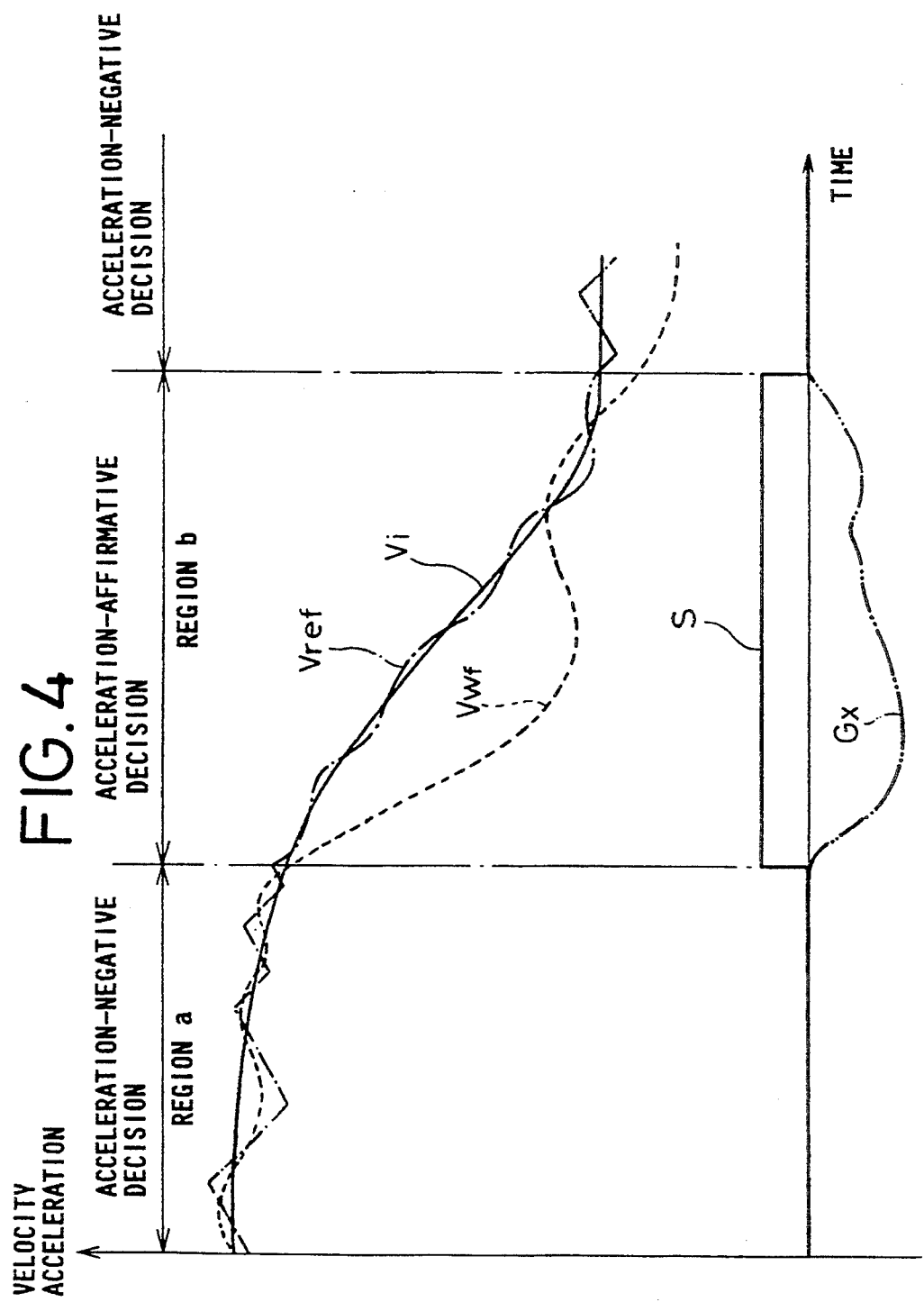
FIG. 4 is a waveform chart explaining the result of calculation of the estimated velocity of the vehicle by the system shown in FIG. 1.
Figure 5:
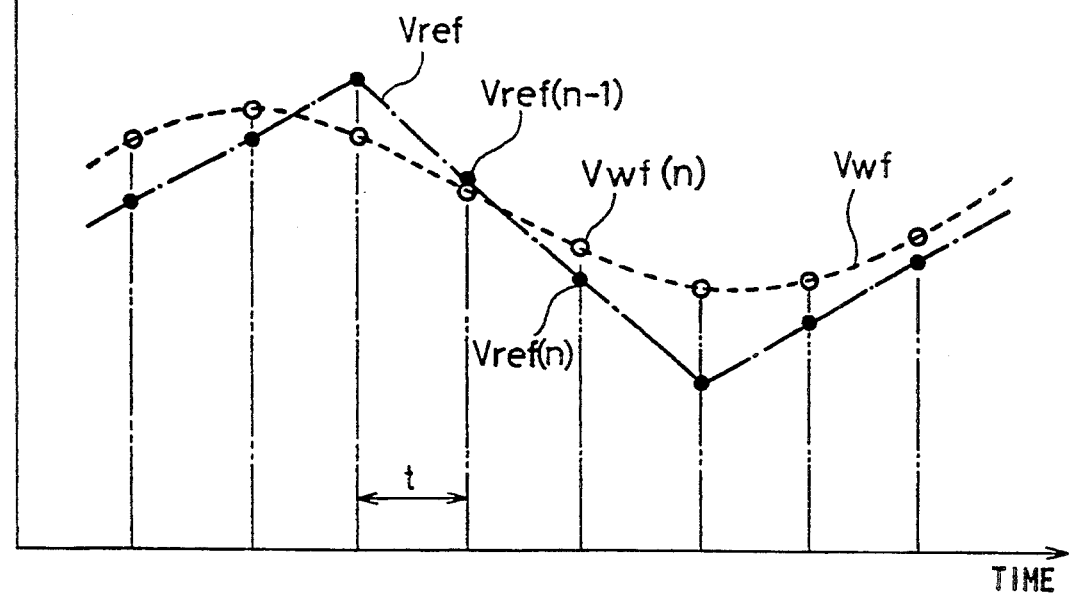
FIG. 5 is a graph explaining the way of calculating an estimated velocity of the vehicle by the system shown in FIG. 1.

In FIG. 4, there is shown a relationship between an actual or true velocity of the vehicle $V_i$ (solid line), the peripheral velocity of the wheel $V_{wf}$ (dashed line) and the estimated velocity of the vehicle $V_{ref}$ (chain line), the latter two being determined by the brake control system 30. The true velocity of the vehicle $V_i$ is shown for demonstrating the reliability of the estimated velocity of the vehicle $V_{ref}$, which has been determined by the brake control system 30 according to the present invention. The velocity of the vehicle $V_i$ represents a value which has been experimentally measured by a high-precision laser Doppler radar, a velocity detecting wheel or the like. These devices cannot be equipped on normally-used vehicles because of their cost, size and weight. However, the friction coefficients of the road surface can be determined with sufficient accuracy by the brake control system according to the present invention, without these expensive devices. The graph shown in FIG. 4 is substantially divided into two regions, which comprise a region a in which the vehicle is not being accelerated, and a region b in which the vehicle is being accelerated. FIG. 5 is an enlarged diagram of the region a of FIG. 4.

The brake control system 30 makes a decision whether the vehicle is being accelerated or decelerated, based on the acceleration of the vehicle $G_x$. Methods of calculating the estimated velocity of the vehicle $V_{ref}$ are separately employed depending on the region in which the acceleration of the vehicle is not being carried out and the region in which the acceleration of the vehicle is being effected. Incidentally, the estimated vehicle velocity calculating circuit 36 calculates the estimated velocity of the vehicle $V_{ref(n)}$ for each predetermined computing interval t in the following manner. Here, (n) in $V_{ref(n)}$ indicates a value obtained in an nth computing cycle.

During a time interval in which the motorcycle 10 is running, the sensor 20 first senses the rotational speed of the driven wheel (front wheel 14) as a pulse train and outputs it to the wheel speed calculating circuit 32. The wheel velocity calculating circuit 32 calculates the peripheral velocity of the front wheel $V_{wf(n)}$ based on the pulse train per unit time interval (Step S1) and outputs it to the estimated vehicle velocity calculating circuit 36.

On the other hand, the sensor 24 attached to the main body 12 detects the acceleration of the vehicle $G_x$ (Step S2) and outputs it to the acceleration and deceleration deciding circuit 34 and the estimated vehicle velocity calculating circuit 36.

Then, the acceleration and deceleration deciding circuit 34 decides whether the absolute value of the acceleration of the vehicle $G_x$ is greater than a predetermined value β (|G_x|>β, where β>0) (Step S3). If |G_x|>β, it is decided that there is acceleration. If not, it is decided that there is no acceleration. The threshold value β has been introduced to make a stable decision on the acceleration of the vehicle $G_x$ in the presence of noise.

If the answer is NO in Step S3, then the difference between the wheel peripheral velocity $V_{wf(n)}$ and the actual vehicle velocity $V_i$ is normally slight as indicated by the region a in FIG. 4. It is also considered that the acceleration of the vehicle $G_x$ obtained from the sensor 24 falls in the presence of noise produced due to vibrations of the motorcycle 10, for example. Then, if the acceleration deciding signal indicative of the absence of the acceleration is supplied from the acceleration deciding circuit 34, then the estimated vehicle velocity calculating circuit 36 calculates the estimated velocity of the vehicle $V_{ref(n)}$ based on a preset acceleration or deceleration which will be described below.

That is, if it is decided in Step S3 that there is no acceleration, it is then determined whether the wheel peripheral velocity $V_{wf(n)}$ inputted this time is greater than an estimated velocity of the vehicle $V_{ref(n-1)}$ obtained in the previous computation (Step S4). If the answer is YES in Step S4, then the estimated velocity of the vehicle $V_{ref(n)}$ is determined by the following equation (Step S5):

$$V_{ref(n)} = V_{ref(n-1)} + G_1 \times t$$

where $G_1$ (>0) is a preset acceleration, and t is a computing interval.

If the answer is NO in Step S4, it is then decided whether the estimated velocity of the vehicle $V_{ref(n-1)}$ is greater than the wheel peripheral velocity $V_{wf(n)}$ (Step S6). If the answer is YES in Step S6, then the estimated velocity of the vehicle $V_{ref(n)}$ is determined as (Step S7):

$$V_{ref(n)} = V_{ref(n-1)} - G_2 \times t$$

where $G_2$ (>0) and t are respectively a preset deceleration and a computing interval.

If the answer is NO in Step S6, that is, the estimated velocity of the vehicle $V_{ref(n-1)}$ is not greater than the wheel peripheral velocity $V_{wf(n)}$, then the estimated velocity of the vehicle $V_{ref(n)}$ is determined as (Step S8):

$$V_{ref(n)} = V_{ref(n-1)}$$

As has been described in Steps S4 through S8, the wheel peripheral velocity $V_{wf(n)}$ is compared with the estimated velocity of the vehicle $V_{ref(n-1)}$. Then, whether the vehicle is being accelerated or decelerated with respect to the previous estimated velocity of the vehicle $V_{ref(n-1)}$ or there is no acceleration is determined based on the result of comparison. Under the acceleration and deceleration $G_1$ and $G_2$ respectively set based on the result of determination, the estimated velocity of the vehicle $V_{ref(n)}$ is updated or the previous estimated velocity of the vehicle $V_{ref(n-1)}$ is maintained as it is. Since the acceleration of the vehicle $G_x$ is low (i.e., $G_x<\beta$) as indicated by the region a in FIG. 4, the slippage ratio $S_{f(n)}$ of the front wheel is small and the difference between the velocity of the vehicle $V_i$ and the wheel peripheral velocity $V_{wf(n)}$ decreases. Accordingly, the estimated velocity of the vehicle $V_{ref(n)}$ can be determined with high accuracy using the wheel peripheral velocity $V_{wf(n)}$ as an alternative to the velocity of the vehicle $V_i$.

Since, on the other hand, the wheels of the motorcycle 10 slip on the road surface upon deceleration, for example, the difference between the wheel peripheral velocity $V_{wf}$ and the actual velocity of the vehicle $V_i$ increases, as illustrated by the region b in FIG. 4. Thus, when the estimated velocity of the vehicle $V_{ref(n)}$ is calculated based on the wheel peripheral velocity $V_{wf(n)}$ as described in Steps S4 through S8, an estimated velocity of the vehicle $V_{ref}$ close to the actual velocity of the vehicle $V_i$ cannot be obtained with high accuracy.

When it is decided by the acceleration deciding circuit 34 that the acceleration of the vehicle $G_x$ is greater than the predetermined value β, it is decided that the vehicle is in an acceleration or deceleration state. The estimated velocity of the vehicle $V_{ref(n)}$ is determined as (Step S9):

$$V_{ref(n)} = V_{ref(n-1)} + G_x dt$$

where t represents a computing interval.

Even when the peripheral velocity $V_{wf}$ of the rear wheel 16 is used, the estimated velocity of the vehicle $V_{ref}$ can be obtained in the same manner.

Thus, the estimated velocity of the vehicle $V_{ref(n)}$ can be obtained very accurately by making use of the value of the acceleration of the vehicle $G_x$ only when it is decided that the vehicle is in the acceleration or deceleration state.

The estimated velocity of the vehicle $V_{ref(n)}$ determined in this way and the peripheral velocities $V_{wf(n)}$ and $V_{wr(n)}$ of the front and rear wheels 14 and 16 are supplied to the slippage ratio calculating circuit 38. The slippage ratio calculating circuit 38 calculates a slippage ratio $S_{f(n)}$ of the front wheel 14 and a slippage ratio $S_{r(n)}$ of the rear wheel 16 based on an equation given by $S_{(n)} = (V_{ref(n)} - V_{w(n)})$ using the estimated velocity of the vehicle $V_{ref(n)}$ and the wheel peripheral velocities $V_{wf(n)}$ and $V_{wr(n)}$, and outputs the same to the braking signal generating circuit 40. In the braking signal generating circuit 40, it is decided that the brake is in operation when each of the slippage ratios $S_{f(n)}$ and $S_{r(n)}$ is greater than 3%. Then, each of the braking signals $\lambda_{B1(n)}$ and $\lambda_{B2(n)}$ is set to 1 and outputted to the banking angle calculating circuit 42.

Figure 6:
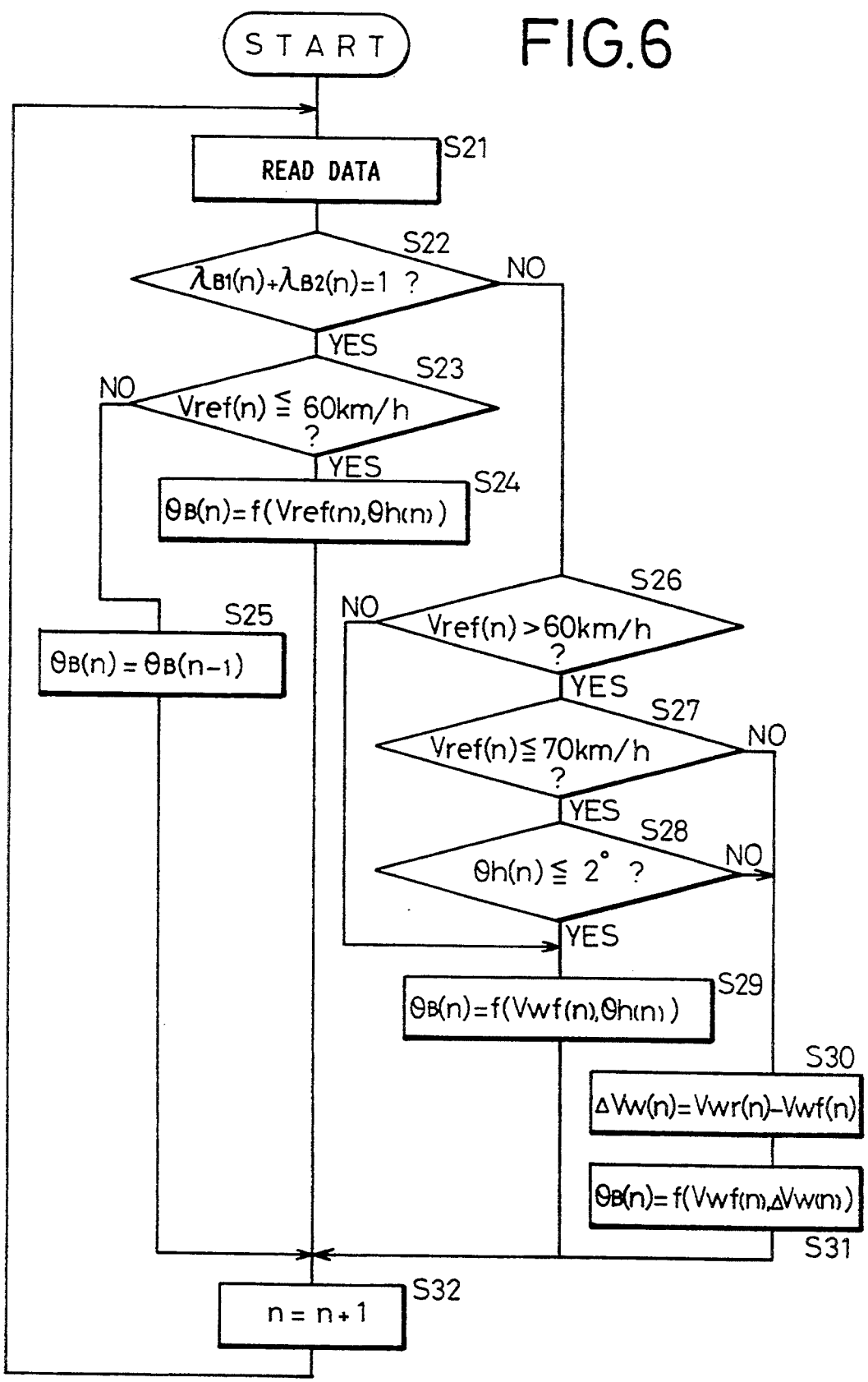
FIG. 6 is a flowchart describing the way of calculating a banking angle by the system shown in FIG. 1.

In the banking angle calculating circuit 42, the banking angle $\theta_B$ is determined in the following manner. A method of calculating the banking angle will be described with reference to a flowchart of FIG. 6.

First, the estimated velocity of the vehicle $V_{ref(n)}$, the wheel peripheral velocities $V_{wf(n)}$ and $V_{wr(n)}$ and the braking signals $\lambda_{B1(n)}$ and $\lambda_{B2(n)}$ all of which have been determined in the above-described manner, and the steering angle $\theta_{h(n)}$ detected by the steering angle sensor 26 are read (Step S21). It is then decided whether a logical sum of the braking signals $\lambda_{B1(n)}$ and $\lambda_{B2(n)}$ is 1; that is, whether the brake is in operation (Step S22). If it is decided that each brake is in operation, it is then decided whether the estimated velocity of the vehicle $V_{ref(n)}$ is less than or equal to 60 km/h (Step S23). If the answer is YES in Step S23, then the banking angle $\theta_{B(n)}$ is determined from the estimated velocity of the vehicle $V_{ref(n)}$ and the steering angle $\theta_{h(n)}$ using the LUT 44 shown in FIG. 7 (see a region (I) in FIG. 8). A relationship shown in FIG. 7 between the steering angle $\theta_h$ set based on experimental data and the estimated velocity of the vehicle $V_{ref}$ vs. banking angle $\theta_B$ is stored as data in the LUT 44. The banking angle $\theta_{B(n)}$ is determined based on the data (see the arrow in FIG. 7) (Step S24). Since the difference between the peripheral velocity $V_{wf(n)}$ of the front wheel 14 and the actual velocity of the vehicle greatly increases due to the slippage when the brake is in operation, the estimated velocity of the vehicle $V_{ref(n)}$ is used as an alternative to the wheel peripheral velocity $V_{wf(n)}$. As a result, the banking angle $\theta_{B(n)}$ can be obtained with sufficient accuracy based on the estimated velocity of the vehicle $V_{ref(n)}$ and the steering angle $\theta_{h(n)}$.

Figures 7, 8:
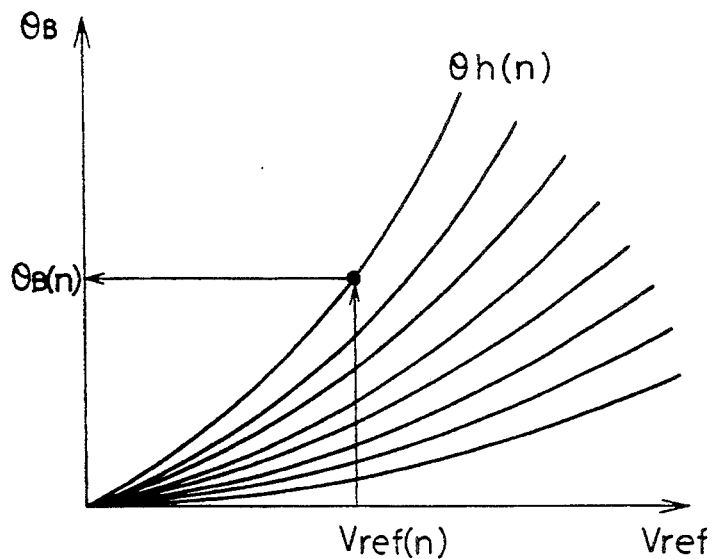
FIG. 7 is a graph explaining the relationship between an estimated velocity of the vehicle at a certain steering angle and a banking angle, both of which are obtained by the system shown in FIG. 1.
FIG. 8 is a table explaining the way of calculating a banking angle by the system shown in FIG. 1.

If it is decided in Step S23 that the estimated velocity of the vehicle $V_{ref(n)}$ is greater than or equal to 60 km/h, then the banking angle $\theta_{B(n)}$ is held as the previous banking angle $\theta_{B(n-1)}$ as it is (see a region (II) in FIG. 8) (Step S25). The reason is that when the estimated velocity of the vehicle $V_{ref(n)}$ is greater than or equal to 60 km/h upon activation of the brake, the value of a difference in wheel peripheral velocity $\Delta V_{w(n)}$ to be described later, is small because the brake is in operation and hence the banking angle $\theta_{B(n)}$ cannot be determined properly.

Figure 9:
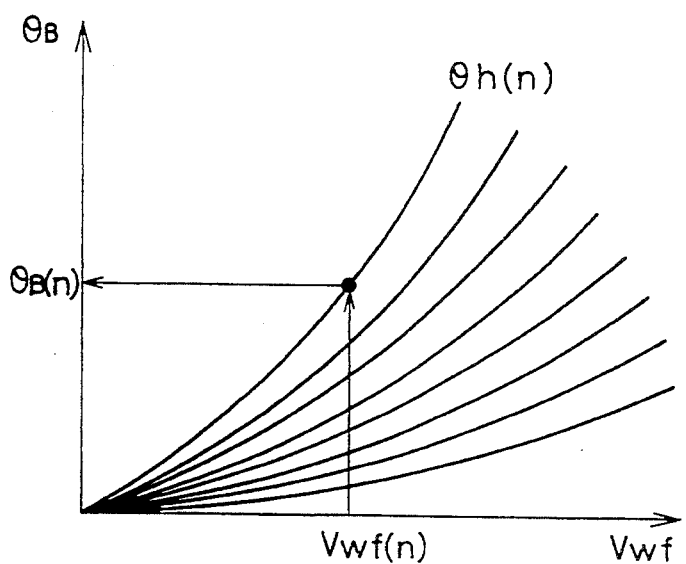
FIG. 9 is a graph explaining a relationship between a peripheral velocity of a driven wheel at a certain steering angle and a banking angle, both of which are obtained by the system shown in FIG. 1.

If it is decided in Step S22 that the brake is not being actuated (i.e., $\lambda_{B1(n)} + \lambda_{B2(n)} = 0$), it is then decided whether the estimated velocity of the vehicle $V_{ref(n)}$ is greater than 60 km/h (Step S26). If the answer is YES in Step S26, it is then decided whether the estimated velocity of the vehicle $V_{ref(n)}$ is less than or equal to 70 km/h (Step S27). If the answer is YES in Step S27, that is, 60 km/h $< V_{ref(n)} \leq$ 70 km/h, it is then decided whether the steering angle $\theta_{h(n)}$ is less than or equal to 2° (Step S28). If the answer is YES in Step S28 or it is decided in Step S26 that the estimated velocity of the vehicle $V_{ref(n)}$ is less than 60 km/h, it is then decided that there is a correlation between the banking angle $\theta_{B(n)}$ and the steering angle $\theta_{h(n)}$. Further, the banking angle $\theta_{B(n)}$ is determined based on the wheel peripheral velocity $V_{wf(n)}$ and the steering angle $\theta_{n(n)}$ using the LUT 46 shown in FIG. 9 (see regions (IV) and (III) in FIG. 8). A relationship between the steering angle $\theta_h$ set based on experimental data and the peripheral velocity of the vehicle $V_{wf}$ versus banking angle $\theta_B$ is stored as data in the LUT 46. The banking angle $\theta_{B(n)}$ is determined based on the data (see the arrow in FIG. 9) (Step S29).

Figure 10:
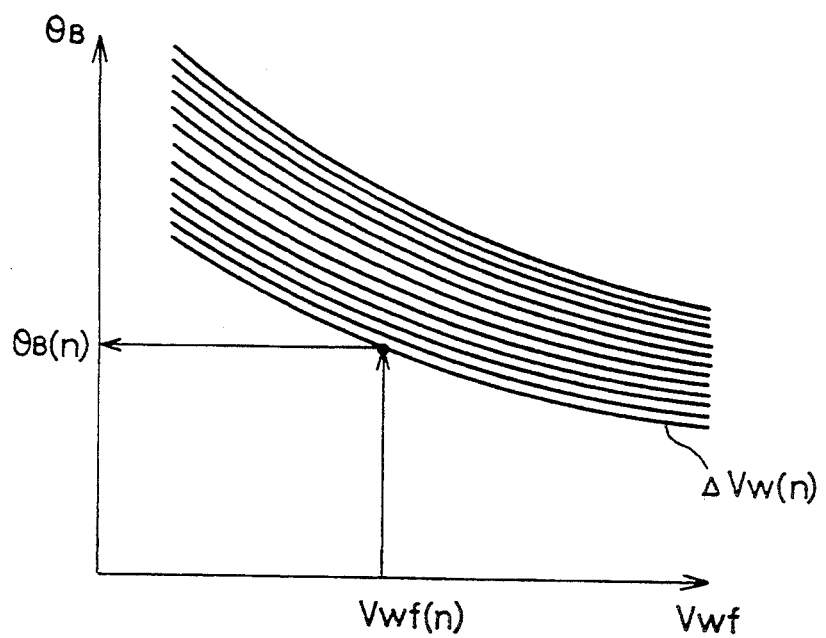
FIG. 10 is a graph describing a relationship between a peripheral velocity of a driven wheel and a banking angle both of which are obtained by the system shown in FIG. 1, where a given difference in peripheral velocity between the driven wheel and a driving wheel occurs.

If the estimated velocity of the vehicle $V_{ref(n)}$ is greater than or equal to 70 km/h or the estimated velocity of the vehicle $V_{ref(n)}$ is greater than 60 km/h and less than or equal to 70 km/h and the steering angle $\theta_{B(n)}$ is greater than or equal to 2° (Steps S27 and S28), it is then decided that there is no correlation between the banking angle $\theta_{B(n)}$ and the steering angle $\theta_{h(n)}$, and the difference $\Delta V_{w(n)}$ between the peripheral velocities $V_{wf(n)}$ and $V_{wr(n)}$ of the front and rear wheels 14 and 16 is determined (Step S30). Then, the banking angle $\theta_{B(n)}$ is obtained based on the peripheral velocity $V_{wf(n)}$ of the front wheel 14 and the difference $\Delta V_{w(n)}$ using the LUT 48 shown in FIG. 10 (see regions (VI) and (V) in FIG. 8). The relationship between the difference $\Delta V_w$ set based on experimental data and the wheel peripheral velocity $V_{wf}$ versus banking angle $\theta_B$ is stored as data in the LUT 48. The banking angle $\theta_{B(n)}$ is obtained based on the data (see the arrow in FIG. 10) (Step S31). This is taking advantage of the fact that the difference $\Delta V_w$ is produced because radii of the front and rear wheels differ from each other and the difference $\Delta V_w$ varies as an actual turning radius of each wheel changes with the banking angle $\theta_B$. That is, each of the peripheral velocities $V_{wf}$ and $V_{wr}$ is calculated based on each wheel turning radius (distance between the center of each rotating wheel and a point where the wheel is grounded) at the time that each wheel is vertically positioned, that is, the rotational speed (number of revolutions) and the banking angle are 0°. When, however, the vehicle is inclined, the turning radius of each wheel is reduced even if the velocity of the vehicle is constant. Thus, the actual number of revolutions of the wheel increases and the calculated peripheral velocities $V_{wf}$ and $V_{wr}$ increase. Since the radii of the front and rear wheels 14 and 16 differ from each other, the difference $\Delta V_w$ between the peripheral velocities of the wheels is produced and the difference $\Delta V_w$ varies according to the banking angle $\theta_B$. Therefore, the banking angle $\theta_B$ can be obtained with sufficient accuracy.

After the banking angle $\theta_{B(n)}$ has been determined in Steps S24, S25, S29 and S31 in this way, the calculation of the banking angle $\theta_{B(n)}$ is further repeated (Step S32).

Incidentally, the respective values of the estimated velocity $V_{ref}$ (=60 km/h and 70 km/h) and the steering angle $\theta_h$ (=2°), all of which have been used as the criteria, are values determined depending on the characteristics of the vehicle. However, the estimated velocity of the vehicle and the steering angle are not necessarily limited to the values.

Figure 11:
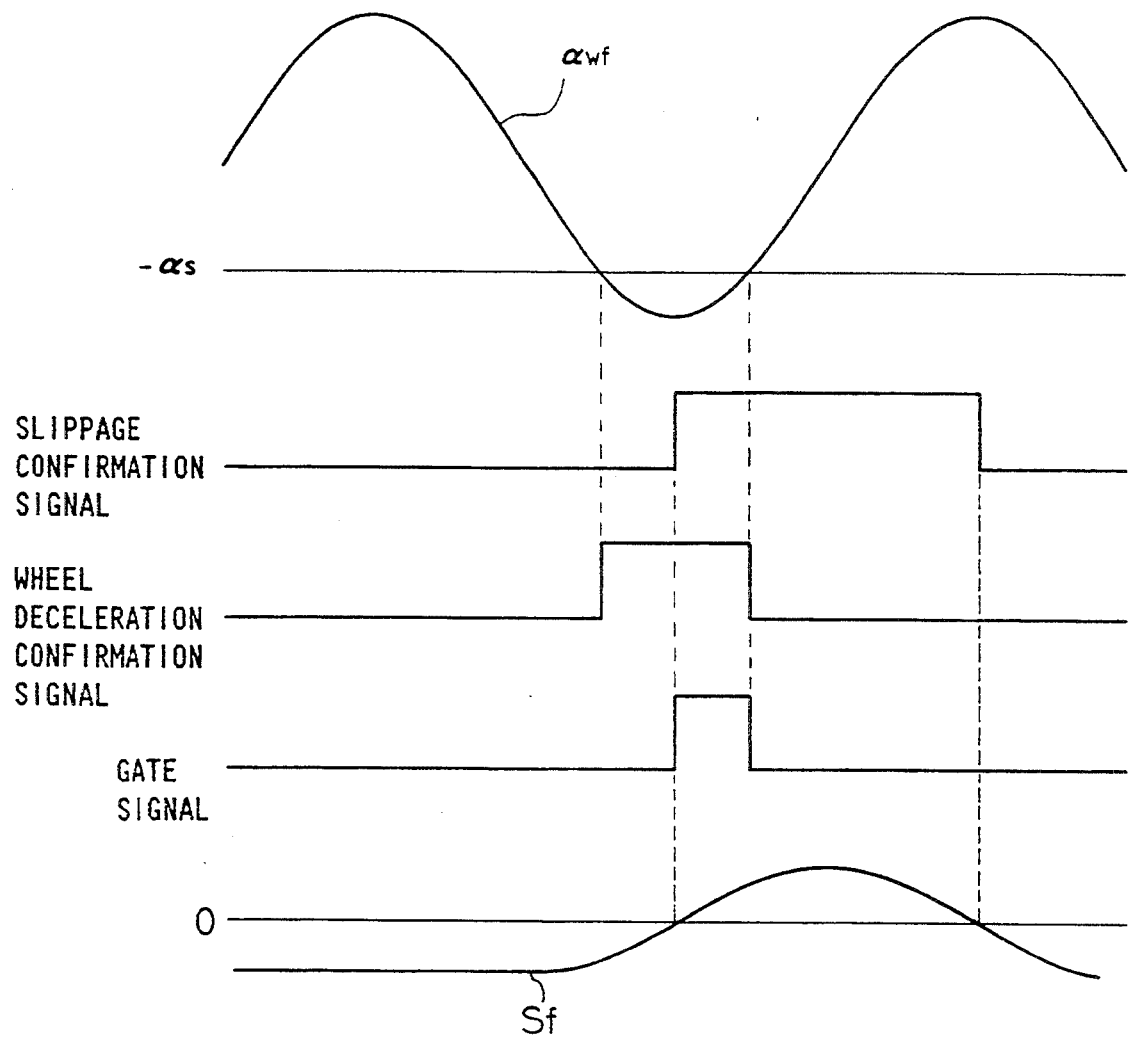
FIG. 11 is a waveform chart explaining the generation of a gate signal by the system shown in FIG. 1.

A description will now be made of the way of calculating the coefficient of friction $\mu_f$ between the road surface and the driven wheel (front wheel 14) with reference to FIG. 11.

The signal indicative of the peripheral velocity $V_{wf}$ of the front wheel 14, which has been determined by the wheel speed calculating circuit 32, is outputted to a wheel acceleration calculating circuit 50. The wheel acceleration calculating circuit 50 calculates an acceleration of the front wheel $\alpha_{wf}$ based on the wheel peripheral velocity $V_{wf}$.

The slippage ratio $S_f$ determined by the slippage calculating circuit 38 is outputted to the gate signal generating circuit 52 together with the peripheral acceleration of the wheel $\alpha_{wf}$. The gate signal generating circuit 52 generates a slippage confirmation signal which goes high in level when $S_f > 0$, that is, when each wheel is slipping on the road surface, as shown in FIG. 11. Further, the gate signal generating circuit 52 produces a wheel deceleration confirmation signal which goes high in level when $\alpha_{wf} \leq -\alpha_s$ ($\alpha_s$: positive predetermined value), that is, when the wheel peripheral velocity $\alpha_{wf}$ is less than or equal to a predetermined value. The gate signal generating circuit 52 outputs a logical product of both the slippage confirmation signal and the wheel acceleration confirmation signal to the friction coefficient calculating circuit 54 as a gate signal. Incidentally, the generation of the gate signal suggests the possibility that the brake control system will enter into the limiting control mode for limiting the hydraulic pressure of the brake.

The friction coefficient calculating circuit 54 detects a rise in the gate signal and starts computing the coefficient of friction. The slippage ratio $S_r$ of the rear wheel 16, which has been determined in the same manner as that of the front wheel 14, and the acceleration of the vehicle $G_x$ are supplied to the friction coefficient calculating circuit 54.

In the friction coefficient calculating circuit 54, the coefficient of friction $\mu_f$ between the road surface and the front wheel 14 is determined from the following equation based on the slippage ratio $S_r$ of the rear wheel 16 and the acceleration of the vehicle $G_x$:

$$\mu_f = (A - B \times K_x) \times G_x$$

where A and B are constants, and $K_x$ represents a coefficient set in advance according to the slippage ratio $S_r$ of the rear wheel 16.

That is, when the coefficient of friction $\mu_f$ between the road surface and the front wheel 14 is determined from the acceleration of the vehicle $G_x$, the term $B \times K_x$ as a correction term related to the coefficient of friction $\mu_r$ between the road surface and the rear wheel 16, is subtracted from the term $A \times G_x$. Thus, the coefficient of friction $\mu_r$ between the road surface and the front wheel 14 can be detected accurately.

Similarly to the front wheel 14, a gate signal is produced only when both the peripheral acceleration $\alpha_{wr}$ and the slippage ratio $S_r$ of the rear wheel 16 respectively satisfy predetermined conditions. In this condition, the coefficient of friction $\mu_r$ between the road surface and the rear wheel 16 can be obtained based on the slippage ratio $S_f$ of the front wheel 14 and the acceleration of the vehicle $G_x$.

The estimated velocity of the vehicle $V_{ref(n)}$, the banking angle $\theta_{B(n)}$ and the coefficient of friction $\mu_{f(n)}$, which have been determined in the above-described manner, are outputted to the target slippage ratio calculating circuit 64. The target slippage ratio calculating circuit 64 calculates a target slippage ratio $Smax_f$ in the following manner.

Figure 12:
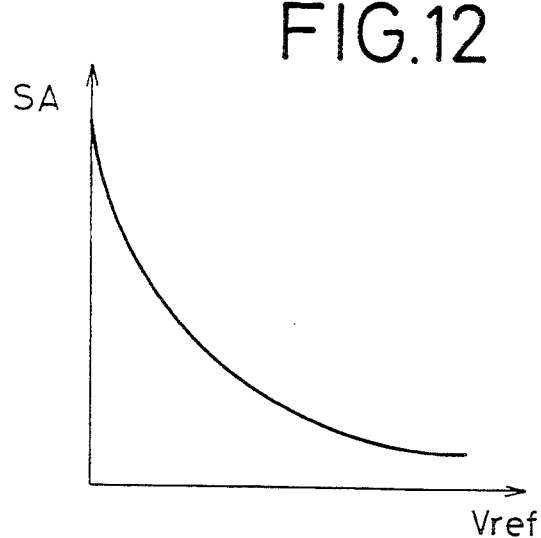
FIG. 12 is a graph describing a relationship between an estimated velocity of the vehicle and the optimum slippage ratio, both of which are obtained by the system shown in FIG. 1.
Figure 13:
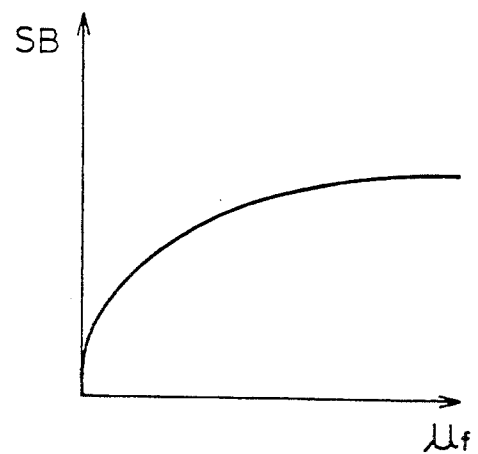
FIG. 13 is a graph explaining the relationship between a coefficient of friction of a road surface and the optimum slippage ratio, both of which are obtained by the system shown in FIG. 1.
Figure 14:
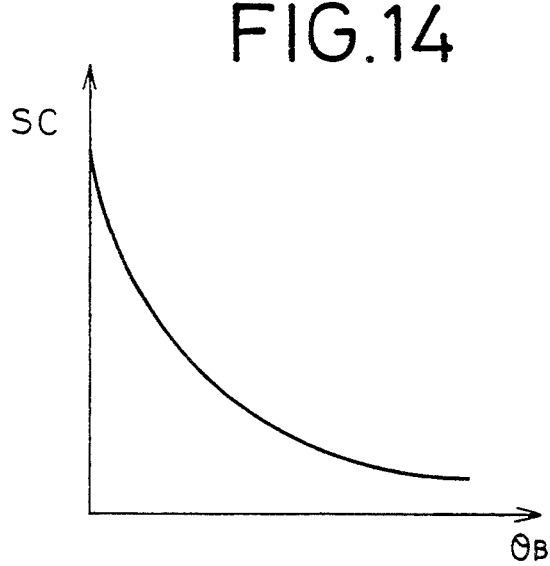
FIG. 14 is a graph explaining the relationship between a banking angle and the optimum slippage ratio both of which are obtained by the system shown in FIG. 1.

As shown in FIGS. 12 through 14, a diagram showing a relationship between an estimated velocity of the vehicle $V_{ref}$ and the optimum slippage ratio SA, a diagram showing a relationship between the coefficient of friction $\mu_f$ and the optimum slippage ratio SB, and a diagram showing a relationship between the banking angle $\theta_B$ and the optimum slippage ratio SC, illustrate respective relationships which have been experimentally determined to provide an optimum braking force. The relationships are formulated as follows.

The optimum slippage ratio SA with respect to the estimated velocity of the vehicle $V_{ref}$ is approximated as:

$$SA = d - e \times V_{ref}$$

where SA represents a slippage ratio capable of providing the optimum braking force, and d and e are constants.

The optimum slippage ratio SB with respect to the coefficient of friction $\mu_f$ is approximated as:

$$SB = -f/\mu_f + g$$

where SB represents a slippage ratio at which the optimum braking force is obtained, and f and q are constants.

The optimum slippage ratio SC with respect to the banking angle $\theta_B$ is approximated as:

$$SC = h - i \times \theta_B$$

where SC represents a slippage ratio capable of providing the optimum braking force, and h and i are constants.

A target slippage ratio Smax may be determined from the estimated velocity of the vehicle $V_{ref(n)}$, the coefficient of friction $\mu_{f(n)}$ and the banking angle $\theta_{B(n)}$, which have been calculated based on the slippage ratios SA, SB and SC capable of providing the optimum braking forces. However, the following process is conducted to reduce the number of parameters to two, in the present embodiment.

To convert a coefficient of friction $\mu_f$ and a banking angle $\theta_B$ into one parameter, the optimum slippage ratio SD obtained based on the coefficient of friction $\mu_f$ and the banking angle $\theta_B$, is approximated as:

$$SD = j \times \theta_B / \mu_f + k$$

where SD represents a slippage ratio at which the optimum braking force is obtained, and j and k are constants.

A target slippage ratio $Smax_{f(n)}$ is determined from a function f (SA, SD) (see FIG. 15) which has been stored as data in the LUT 65 and has been experimentally measured based on the optimum slippage ratios SA and SD determined in the above-described manner.

Figure 15:
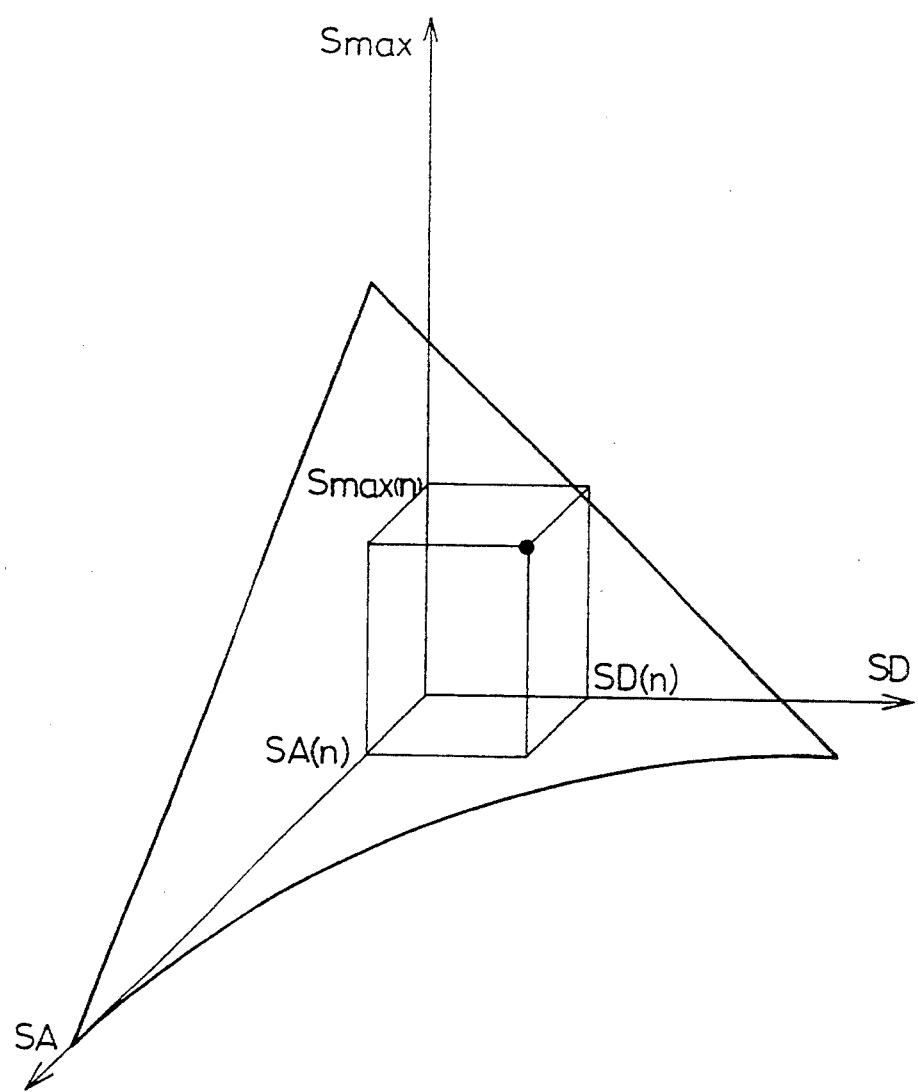
FIG. 15 is a view describing the way of calculating a target slippage ratio by the system shown in FIG. 1.

When the optimum slippage ratio $SA_{(n)}$ is calculated from the calculated estimated velocity of the vehicle $V_{ref(n)}$ and the optimum slippage ratio $SD_{(n)}$ is calculated from the coefficient of friction $\mu_{(n)}$ and the banking angle $\theta_{B(n)}$, for example, the target slippage ratio $Smax_{f(n)}$ is determined as shown in FIG. 15.

The target slippage ratio $Smax_{f(n)}$ determined in this way is multiplied by correction coefficients $\eta j_f$ and $\eta 1$ with respect to the front wheel 14 in such a manner that the behavior of the vehicle does not abruptly vary according to the condition of the road surface.

A description will first be made of the way of calculating the correction coefficient $\eta j_f$.

The friction coefficient calculating circuit 54 supplies the coefficient of friction $\mu_{f(n)}$ to the correction coefficient deciding circuit 56 and the friction coefficient storing circuit 60. Further, the banking angle calculating circuit 42 supplies the banking angle $\theta_{B(n)}$ to the correction coefficient deciding circuit 56.

The correction coefficient deciding circuit 56 reads out the coefficient of friction $\mu_{f(n-1)}$ obtained in the previous computation from the friction coefficient storing circuit 60 and determines the rate of change in the coefficient of friction $\mu_f$, i.e., $\mu_{f(n)}/\mu_{f(n-1)}$ based on the read coefficient of friction $\mu_{f(n-1)}$. Then, the correction coefficient deciding circuit 56 determines the rate of change in the friction coefficient, based on the LUT 58 (see FIG. 16) depending on a decision made as to whether the banking angle $\theta_{B(n)}$ is greater than or equal to a predetermined angle $\theta_0$ or less than the predetermined angle $\theta_0$. In this condition, the correction coefficient deciding circuit 56 calculates the correction coefficient $\eta j_{f(n)}$ based on the value of $\mu_{f(n)}/\mu_{f(n-1)}$ and the value of $\mu_{f(n-1)}$.

Figure 17:
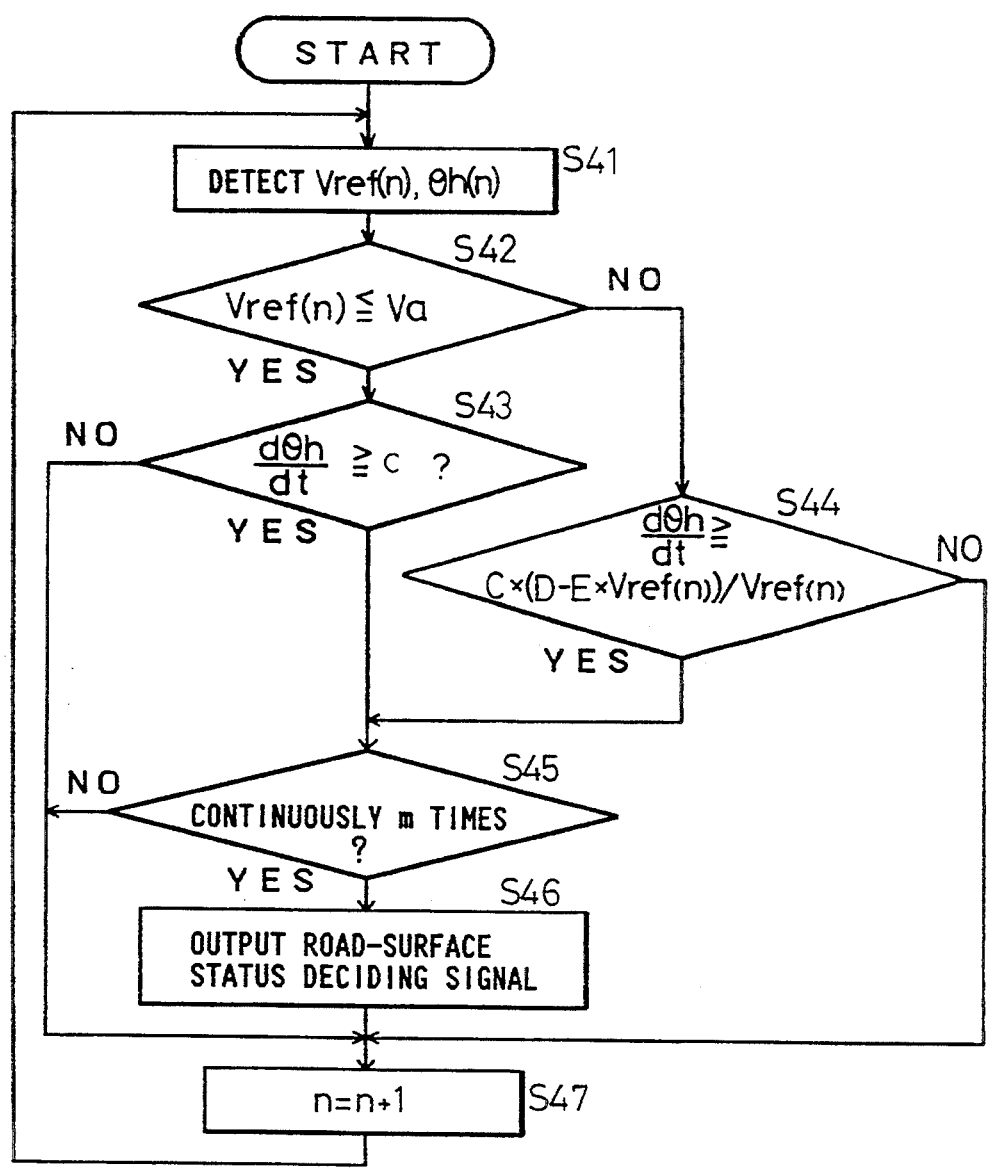
FIG. 17 is a flowchart explaining the way of deciding the state of a road surface by the system shown in FIG. 1.
Figure 18:
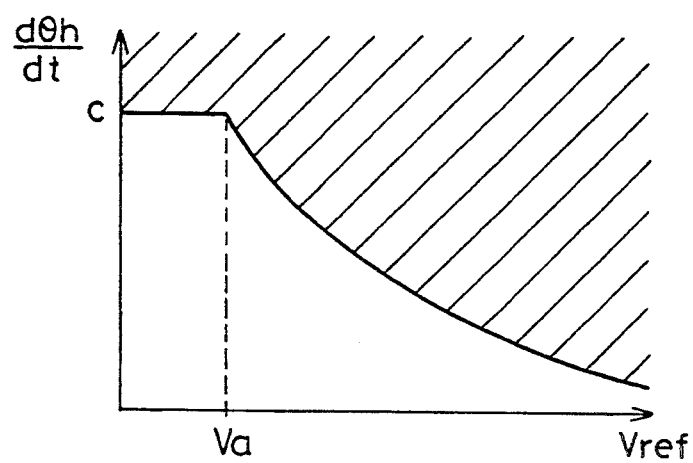
FIG. 18 is a graph explaining the criterion for deciding the state of the road surface by the system shown in FIG. 1.

A description will next be made of the way of calculating the correction coefficient $\eta 1$. In this case, the road-surface condition deciding circuit 62 decides (outputs the correction coefficient $\eta 1$) the condition of the road surface based on the estimated velocity of the vehicle $V_{ref(n)}$ and the steering angle $\theta_{h(n)}$ detected by the steering angle sensor 26. The decision as to the condition of the road surface will be described with reference to a flowchart shown in FIG. 17 and FIG. 18.

First, the estimated velocity of the vehicle $V_{ref(n)}$ calculated in the above-described manner and the steering angle $\theta_{h(n)}$ detected by the steering angle sensor 26 are both supplied to the road-surface condition deciding circuit 62 (Step S41). It is then decided whether the estimated velocity of the vehicle $V_{ref(n)}$ is less than or equal to $V_a$ (Step S42). If the answer is YES in Step S42, it is then decided whether the derivative of the steering angle $\theta_{h(n)}$ is greater than or equal to a predetermined value c (see a straight line in FIG. 18) (Step S43). If the answer is NO in Step S42, it is then decided whether the derivative of the steering value $\theta_{h(n)}$ is greater than or equal to $Cx(D-ExV_{ref(n)})/V_{ref(n)}$ (see the curved line in FIG. 18) (Step S44). Here, C, D and E are constants. If it is decided in Step S43 that the derivative of the steering angle $\theta_{h(n)}$ is greater than or equal to the predetermined value c or it is decided in Step S44 that the derivative of the steering angle $\theta_{h(n)}$ is greater than or equal to $Cx(D-ExV_{ref(n)})/V_{ref(n)}$ (see area marked by oblique lines in FIG. 18), it is then determined whether this condition has been successively detected m times (Step S45). If the answer is YES in Step S45, it is then decided that the handle 18 has been displaced by the irregularity of the road surface, other than the influence of the driver's handle operation. Further, the road-surface condition deciding circuit 62 outputs a road-surface condition deciding signal (correction coefficient $\eta1$) to the target slippage ratio calculating circuit 64 (Step S46). After it has been decided in Step S46 that the road surface is in bad condition (i.e., after the correction coefficient $\eta1=\beta$ (where $0<\beta<1$) has been outputted) or after it has been decided that the road surface is in good condition (i.e., after the correction coefficient $\eta1=\beta$ has been outputted) where the conditions have not been satisfied in Steps S43, S44 and S45, the determination of the condition of the road surface is repeated again (Step S47).

The so-calculated correction coefficients $\eta j_{f(n)}$ and $\eta 1_{(n)}$ are outputted to the target slippage ratio calculating circuit 64. The target slippage ratio calculating circuit 64 corrects the target slippage ratio $Smax_{f(n)}$ based on the correction coefficients $\eta j_{f(n)}$ and $\eta 1_{(n)}$ as:

$$S1_{f(n)} = Smax_{f(n)} \times \eta 1_{(n)} \times \eta j_{f(n)}$$

where $S1_{f(n)}$ represents a corrected target slippage ratio.

The following advantageous effects can be obtained by correcting the target slippage ratio $Smax_{f(n)}$ according to the condition of the road surface. That is, if only the coefficient of friction $\mu_{f(n)}$ varies where the target slippage ratio $Smax_{f(n)}$ is obtained based on the estimated velocity of the vehicle $V_{ref(n)}$, the coefficient of friction $\mu_{f(n)}$ and the banking angle $\theta_{B(n)}$, then the target slippage ratio $Smax_{f(n)}$ is calculated using the coefficient of friction $\mu_{f(n)}$ as:

$$Smax_{f(n)} = f(\mu_{f(n)})$$

where $f(\mu_{f(n)})$ represents a function showing a relationship between a coefficient of friction $\mu_{f(n)}$ and a slippage ratio $Smax_{f(n)}$ capable of providing the maximum braking force under the coefficient of friction $\mu_{f(n)}$, and $Smax_{f(n)}$ represents a target slippage ratio obtained in an nth computing cycle.

Figure 19:
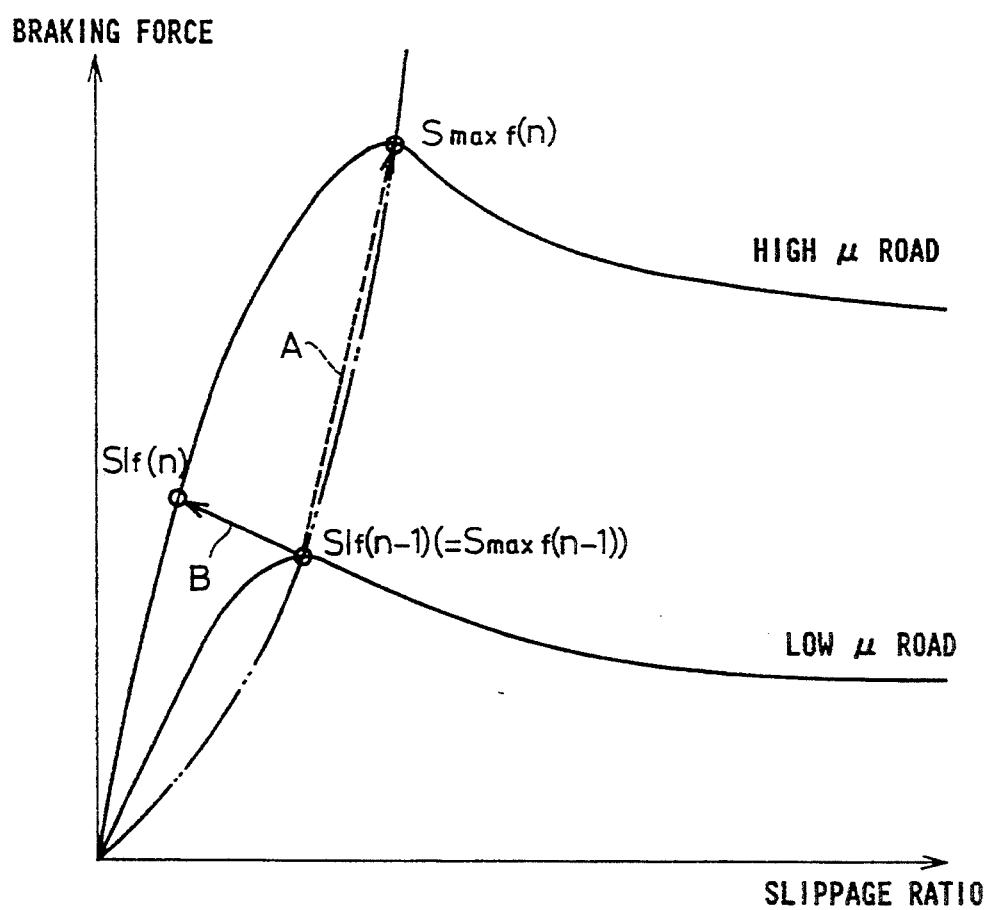
FIG. 19 is a graph explaining the manner of correction of a target slippage ratio by the system shown in FIG. 1.

Thus, as shown in FIG. 19, the target slippage ratio $Smax_{f(n)}$ capable of providing the maximum braking force according to the condition of the road surface can be established based on the function $f(\mu_f)$ showing the relationship between a coefficient of friction $\mu_f$ and a slippage ratio capable of providing the maximum braking force according to the condition of the road surface having the above coefficient of friction.

Then, the target slippage ratio $S1_{f(n)}$ can be determined by multiplying the target slippage ratio $Smax_{f(n)}$ by the correction coefficients $\eta j_{f(n)}$ and $\eta 1_{(n)}$ as:

$$S1_{f(n)} = \eta j_{f(n)} \times \eta 1_{(n)} \times Smax_{f(n)}$$

When the vehicle travels on a road which has been changed from a low $\mu$ road to a high $\mu$ road, for example, the road surface is changed into a $\mu$ jump road surface at a point where the low $\mu$ road is changed to the high $\mu$ road. In this case, the braking force tends to greatly increase as indicated by the arrow A of the broken line in FIG. 19. When, on the other hand, an irregularity appears on the road surface, the braking force tends to greatly vary due to the influence of noise upon multiplication of the target slippage ratio $Smax_{f(n)}$ by the correction efficient $\eta j_{f(n)}$. When, however, the target slippage ratio $Smax_{f(n)}$ is multiplied by the correction coefficient $\eta1$, the target slippage ratio $S1_{f(n)}$ can be reduced as indicated by the arrow B of the solid line in FIG. 19, with the result that the braking force can be prevented from greatly varying. Thus, the vehicle can be smoothly driven regardless of a variation in the condition of the road surface by calculating the target slippage ratio $S1_{f(n)}$ corrected in this way.

Figure 20:
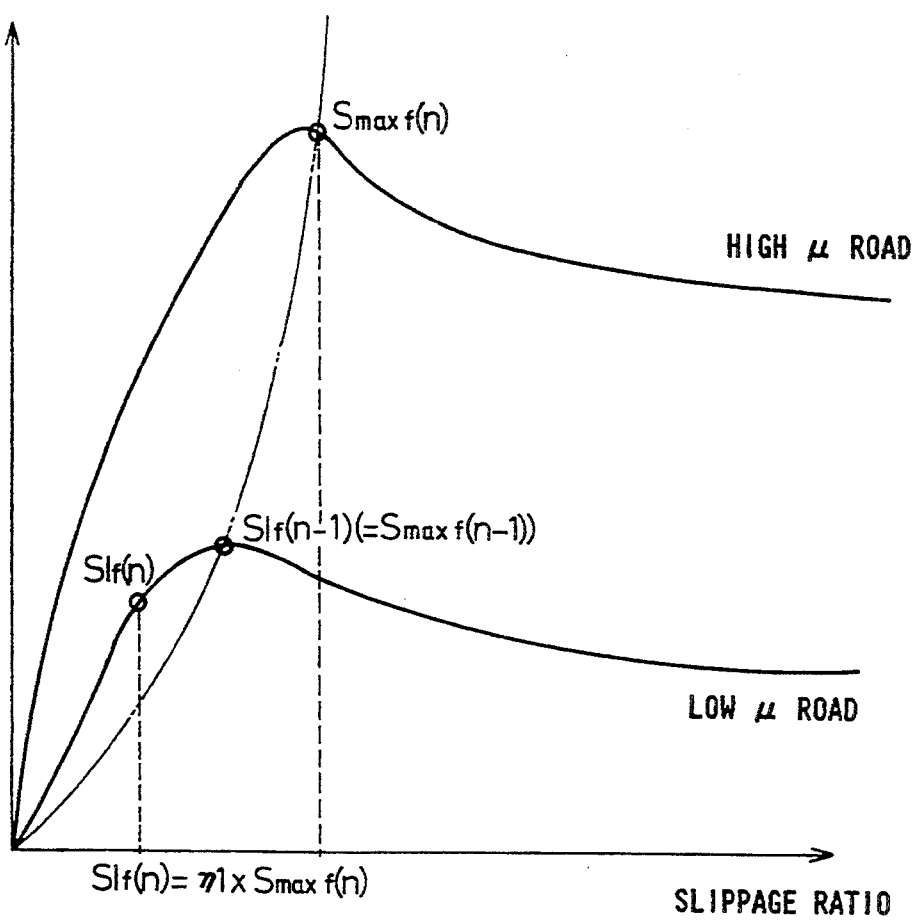
FIG. 20 is a graph explaining the manner of correction of a target slippage ratio by the system shown in FIG. 1.

When the vehicle vibrates due to an irregularity of the road surface while the vehicle is moving on the low $\mu$ road, noise is included in a signal outputted from a sensor for calculating a coefficient of friction $\mu_f$ even in the case of absence of $\eta j_{f(n)} = 1$, i.e., a $\eta$ jump. Therefore, when the vehicle is moving on the low $\mu$ road, the vehicle is regarded as being moving on the high $\mu$ road. Thus, the target slippage ratio $Smax_{f(n)}$, at which the braking force becomes the maximum under the high $\mu$ road, is set as shown in FIG. 20. Therefore, the control of braking of the wheel tends to be effected under the low $\mu$ road at the target slippage ratio $Smax_{f(n)}$. In this case, the braking force is reduced and the slippage ratio increases. However, the target slippage ratio can be reduced so as to be set to the target slippage ratio $S1_{f(n)}$ corresponding to the condition of the road surface as shown in FIG. 20 by multiplying the target slippage ratio $Smax_{f(n)}$ by a correction coefficient $\eta 1_{(n)}(=\beta)$. As a result, a large variation in the braking force can be avoided and the vehicle can be smoothly driven regardless of the condition of the irregularity of the road surface, for example.

Needless to say, the braking of the front wheel 14 can be controlled using the corrected target slippage ratio $S1_{f(n)}$ obtained in the above-described manner. When, however, the target slippage ratio is set to the known brake control system, the restraint coefficient $K_f$ is obtained in the following manner. That is, the target slippage ratio $S1_{f(n)}$ is outputted to the restraint coefficient calculating circuit 66. The restraint coefficient calculating circuit 66 calculates a restraint coefficient $(S1_f/S0_f)$ corresponding to the ratio of the target slippage ratio $S1_f$ to the target slippage ratio $S0_f$ of the front wheel 14, which has been set by the known brake control system. The rate of increase and decrease in the hydraulic pressure of the brake can be suitably controlled by multiplying a valve signal or a target signal produced from the known brake control system, by the so-calculated restraint coefficient $K_f$.

The restraint coefficient $K_r$ can be calculated in the same manner as described above.

In the brake control system 30 according to the present embodiment, the target slippage ratio Smax, at which the optimum braking force can be obtained, is calculated based on the estimated velocity of the vehicle $V_{ref}$, the coefficient of friction $\mu$ and the banking angle $\theta_B$. Therefore, the braking can be controlled with sufficient accuracy inclusive of the behavior of the vehicle. Further, the correction coefficients $\eta 1$, $\eta j_f$ and $\eta j_r$ are determined based on the condition of the road surface. Then, the target slippage ratio Smax is corrected by multiplying the target slippage ratio Smax by the correction coefficients $\eta 1$, $\eta j_f$ and $\eta j_r$. Thus, even if the condition of the road surface is varied when the vehicle is being braked, the vehicle can be smoothly driven without a great variation in the braking force. Further, when the coefficient of friction $\mu$ is determined, the gate signal generating circuit 52 starts to calculate the coefficients of friction $\mu_f$ and $\mu_r$ when the braking is entering into the normal control mode. When the normal control mode is shifted into the limiting control mode, the optimum target slippage ratios Smax$_f$ and Smax$_r$ can be set up based on the coefficients of friction $\mu_f$ and $\mu_r$. As a result, the braking can be controlled properly.

If the table set in the LUT 58 is further divided into desired parts depending on the rate of change in the coefficient of friction, i.e., $\mu_{(n)}/\mu_{(n-1)}$, then the braking can be controlled with higher accuracy.

When functions described above are added to a known vehicle control system which does not take into account the behavior of the vehicle, the ratio of the target slippage ratio S1 obtained as a result of calculation to the target slippage ratio S0 of the system, i.e., a restrain coefficient K, is first determined. Thus, the control of braking of the vehicle can be corrected by simply multiplying the valve signal or the target signal of the brake control system, by the determined restraint coefficient K.

If it is decided by the estimated vehicle velocity calculating circuit 36 that there is no acceleration while the motorcycle 10 is running, then the estimated velocity of the vehicle $V_{ref}$ is obtained from the vehicle accelerations $G_1$ and $G_2$ preset based on the peripheral velocities of the wheels $V_w$. Therefore, the estimated velocity of the vehicle $V_{ref}$ can be obtained with high accuracy without the influence of noise produced from the sensor 24. Upon acceleration, the estimated velocity of the vehicle $V_{ref(n)}$ can be obtained with high accuracy by making use of the acceleration of the vehicle $G_x$ detected by the sensor 24, without being affected by the difference between the wheel peripheral velocities $V_w$ and the actual velocity of the vehicle $V_i$ at the time of slippage.

When the estimated velocity of the vehicle $V_{ref(n)}$ is greater than or equal to 70 km/h, or it is greater than 60 km/h and less than or equal to 70 km/h and the steering angle $\theta_{h(n)}$ is greater than or equal to 2° (see the areas of oblique lines in FIG. 8) in a state free of the control of braking of the vehicle, then the banking angle calculating circuit 42 makes use of the difference $\Delta V_{w(n)}$ obtained by subtracting the peripheral velocity $V_{wf}$ of the front wheel 14 from the peripheral velocity $V_{wr}$ of the rear wheel 16, as an alternative to the steering angle $\theta_{h(n)}$. In this case, each of the peripheral velocities $V_{wf(n)}$ and $V_{wr(n)}$ is calculated based on each wheel turning radius (distance between the center of each rotating wheel and a point where the wheel is grounded) at the time that each wheel meets at a right angle to the ground, i.e., the rotational speed (number of revolutions) and the banking angle are 0°. When, however, the vehicle is inclined, the turning radius of each wheel is reduced even if the velocity of the vehicle is constant. Thus, the actual number of rotations of the wheel increases and hence the calculated peripheral velocities $V_{wf}$ and $V_{wr}$ increase. Since the radii of the front and rear wheels 14 and 16 differ from each other, the difference $\Delta V_{w(n)}$ between the peripheral velocities of the wheels is produced. Further, since the difference $\Delta V_{w(n)}$ varies according to the banking angle $\theta_{B(n)}$, the banking angle $\theta_{B(n)}$ can be obtained with sufficient accuracy. Further, when the estimated velocity of the vehicle $V_{ref(n)}$ is less than or equal to 60 km/h, or it is greater than 60 km/h and less than or equal to 70 km/h and the steering angle $\theta_{h(n)}$ is less than or equal to 2°, then the banking angle $\theta_{B(n)}$ can be obtained based on the relationship between the steering angle $\theta_{h(n)}$ and the peripheral velocity $V_{wf(n)}$ of the front wheel 14. It is further decided based on the slippage ratios $S_f$ and $S_r$ whether the brake is in operation. If it is decided based on the result of decision that the brake is in operation, then a large difference is produced between the peripheral velocity $V_{wf(n)}$ of the front wheel 14 and the actual velocity of the vehicle due to the slippage. Therefore, the estimated velocity of the vehicle $V_{ref(n)}$ is used as an alternative to the wheel peripheral velocity $V_{wf(n)}$. As a result, the banking angle $\theta_{B(n)}$ can be obtained with sufficient accuracy based on the estimated velocity of the vehicle $V_{ref(n)}$ and the steering angle $\theta_{h(n)}$.

In the claims appended hereto, for convenience, the term "acceleration" will be used to mean also "deceleration", being merely the negative of "acceleration".

Having now fully described the invention, it will be apparent to those skilled in the art that many changes and modification can be made without departing from the spirit or scope of the invention as set forth herein.

What is claimed is:

1. A system for obtaining a target slippage ratio for stable braking of a vehicle having two wheels, comprising:

a pair of vehicle speed sensors disposed respectively on the wheels of said vehicle for detecting respective peripheral velocities of said wheels;

slippage ratio calculation means for calculating a slippage ratio between said wheels and a road surface based on signals output from said vehicle speed sensors;

friction coefficient calculating means for calculating a coefficient of friction between at least one of said wheels and a road surface based on a detected acceleration of said vehicle and said slippage ratio;

target slippage ratio setting means for setting a target slippage ratio for said at least one wheel based on said coefficient of friction;

first correction coefficient setting means for detecting a rate of change in said coefficient of friction and setting a first correction coefficient based on said rate of change;

target slippage ratio correcting means for multiplying the target slippage ratio by first correction coefficient thereby to provide a corrected target slippage ratio; and means for applying a braking force to said at least one wheel until said corrected target slippage ratio is reached, and for controlling said braking force so as to maintain said corrected target slippage ratio.

2. A system according to claim 1, wherein said first correction coefficient setting means includes correction coefficient storing means for storing (i) said first correction coefficient, and (ii) a relationship between the rate of change in a coefficient of friction detected with respect to a coefficient of friction detected previously, and said first correction coefficient setting means sets said first correction coefficient based on said rate of change.

3. A system according to claim 2, further comprising banking angle detecting means for detecting a banking angle of the vehicle, wherein a relationship between the banking angle and the first correction coefficient is stored in said correction coefficient storing means and the first correction coefficient is set up based on the banking angle.

4. A system according to any of claims 1, 2 or 3, wherein said friction coefficient calculating means comprises:
  said slippage ratio calculating means, wherein said slippage ratio calculating means calculates said slippage ratio of said at least one wheel based on the peripheral velocity of said at least one wheel and an estimated velocity of the vehicle;
  vehicle acceleration detecting means for detecting an acceleration of the vehicle;
  wheel acceleration calculating means for calculating a peripheral acceleration of said at least one wheel based on the peripheral velocity of said at least one wheel; and
  calculating instruction means for generating a calculation instructing signal when the slippage ratio of said at least one wheel and the peripheral acceleration of said at least one wheel respectively reach predetermined values;
  wherein said coefficient of friction between the road surface and said at least one wheel is calculated based on the slippage ratio of the other wheel and said acceleration of the vehicle detected in response to said calculation instructing signal.

5. A system according to claim 4, wherein said calculating instruction means generates the calculation instructing signal when the peripheral acceleration of said at least one wheel reaches the predetermined value and the slippage ratio of said at least one wheel becomes positive.

6. A system according to any of claims 1, 2 or 3, further comprising second correction coefficient setting means for detecting the condition of an irregularity of the road surface and setting a second correction coefficient for calculating the target slippage ratio based on the detected condition of irregularity and wherein said target slippage ratio correcting means further multiplies the target slippage ratio by the second correction coefficient thereby to correct the target slippage ratio.

7. A system according to claim 6, further comprising:
  an estimated vehicle velocity detecting means for detecting an estimated velocity of the vehicle; and
  steering angle detecting means for detecting the steering angle of a steering device of the vehicle;
  wherein said second correction coefficient setting means sets the second correction coefficient for calculating the target slippage ratio based on a rate of change in the steering angle with respect to the estimated velocity of the vehicle.

8. A device for estimating the velocity of a vehicle based on a peripheral velocity of each wheel and on a detected acceleration of the vehicle, comprising:
  a plurality of vehicle speed sensors disposed respectively on each said wheel of said vehicle for detecting a rotational speed of each said wheel;
  accelerator means disposed on said vehicle for controlling an acceleration of the vehicle;
  wheel velocity calculating means for calculating the peripheral velocity of each said wheel based on signals output from said vehicle speed sensors;
  vehicle acceleration detecting means for detecting the detected acceleration of the vehicle;
  acceleration determining means for determining, based on a signal from said vehicle acceleration detecting means, whether the vehicle is in an acceleration state; and
  estimated vehicle velocity calculating means for comparing the peripheral velocity of each said wheel and a present estimated velocity of the vehicle when it is determined by said acceleration determining means that the vehicle is not in an acceleration state, successively updating the estimated velocity of the vehicle while said vehicle is accelerating or decelerating based on a result of the comparison, and successively updating the present estimated velocity of the vehicle while said vehicle is accelerated when it is decided that the vehicle is in an acceleration state.

9. A device for calculating a banking angle of a vehicle having a front wheel and a rear wheel, comprising:
  a first vehicle speed sensor disposed on said front wheel for detecting a peripheral velocity of said front wheel;
  a second vehicle speed sensor disposed on said rear wheel for detecting a peripheral velocity of said rear wheel;
  means for calculating respective slip ratios of said front wheel and said rear wheel and a road surface based on signals output from said first and second vehicle speed sensors;
  accelerator means disposed on said vehicle for controlling an acceleration of the vehicle;
  front wheel velocity calculating means for calculating the peripheral velocity of the front wheel based on signals output from said first vehicle speed sensor;
  rear wheel velocity calculating means for calculating the peripheral velocity of the rear wheel based on signals output from said second vehicle speed sensor;
  vehicle acceleration detecting means for detecting an acceleration of the vehicle;
  vehicle velocity estimating means for estimating a velocity of the vehicle based on said peripheral velocity of each said front and rear wheel and the detected acceleration of the vehicle;
  first banking angle storing means for storing the relationship between (i) a difference in the peripheral velocities of the front and rear wheel and (ii) the banking angle with respect to the peripheral velocity of the front wheel;
  means for calculating said banking angle when the estimated velocity of the vehicle reaches a predetermined value based on said peripheral velocity of the front wheel and said difference in the respective peripheral velocities of the front and rear wheels;
  means for correcting a target slip ratio of at least one of said front and rear wheels based on a calculated banking angle; and
  means for applying a braking force to at least one of said front and rear wheels until the corrected target slip ratio is reached, and for controlling said braking force so as to maintain said corrected target slip ratio.

10. A device according to claim 9, further comprising:
   steering angle detecting means for detecting the steering angle of a steering device of the vehicle; and
   second banking angle storing means for storing the relationship between the steering angle and the peripheral velocity of the front wheel,
   whereby, when said estimated velocity of the vehicle is below a predetermined value, a banking angle is calculated from said peripheral velocity of front wheel and said detected steering angle, using said second banking angle storing means relationship.

11. A device according to claim 10, further comprising:
   braking detecting means for detecting the braking of the vehicle; and
   third banking angle storing means for storing the relationship between the estimated velocity of the vehicle in a braked state and the banking angle with respect to the steering angle,
   whereby, when the braking of the vehicle has been detected by said braking detecting means, the banking angle with respect to the steering angle is determined from the estimated velocity of the vehicle and the steering angle using said third banking angle storing means relationship.

* * * * *